United States Patent [19]
Uematsu et al.

[11] Patent Number: 5,659,815
[45] Date of Patent: Aug. 19, 1997

[54] FOCUS DETECTION DEVICE

[75] Inventors: Kimio Uematsu, Tokyo; Chiyuki Kuwata, Zushi, both of Japan

[73] Assignee: Nikon Corporation, Tokyo, Japan

[21] Appl. No.: 494,976

[22] Filed: Jun. 26, 1995

Related U.S. Application Data

[63] Continuation-in-part of Ser. No. 365,431, Dec. 28, 1994, which is a continuation-in-part of Ser. No. 212,789, Mar. 15, 1994, abandoned.

[30] Foreign Application Priority Data

Mar. 15, 1993 [JP] Japan .................................. 5-080180
Dec. 28, 1993 [JP] Japan .................................. 5-336671
Jun. 24, 1994 [JP] Japan .................................. 6-143245

[51] Int. Cl.$^6$ ........................................................ G03B 3/00
[52] U.S. Cl. ............................................... 396/121; 396/89
[58] Field of Search ................................. 354/400, 406, 354/407, 408, 409, 432, 476; 396/65, 89, 121, 139

[56] References Cited

U.S. PATENT DOCUMENTS

| | | | |
|---|---|---|---|
| 4,529,287 | 7/1985 | Karasaki et al. | 354/406 |
| 4,662,735 | 5/1987 | Karasaki et al. | 354/406 |
| 4,774,539 | 9/1988 | Suda | 354/406 |
| 4,792,669 | 12/1988 | Ohnuki et al. | 354/406 |
| 4,828,383 | 5/1989 | Kunishige et al. | 354/404 |
| 5,017,005 | 5/1991 | Shindo | 354/402 |
| 5,233,382 | 8/1993 | Tahiguchi et al. | 354/403 |
| 5,258,804 | 11/1993 | Suda | 354/406 |
| 5,267,089 | 11/1993 | Yamamoto | 359/822 |

FOREIGN PATENT DOCUMENTS

| | | |
|---|---|---|
| 61-165711 | 7/1986 | Japan . |
| 62-16111 | 7/1987 | Japan . |
| 5-11159 | 1/1993 | Japan . |

OTHER PUBLICATIONS

U.S. application No. 08/212,789, Chiyuki Kuwata, filed Mar. 15, 1994, Assignee Nikon Corporation.
U.S. application No. 08/365431, Chiyuki Kuwata, et al. filed Dec. 28, 1994, Assignee Nikon Corporation.

*Primary Examiner*—Safet Metjahic
*Assistant Examiner*—Nicholas J. Tuccillo

[57] ABSTRACT

A focus detection device for precisely mounting a deflection member in a module body with high reliability. A module body retains a focus detection optical system. A portion of a hollow portion, through which a focus detection light beam passes, is formed by an aperture in the exterior of the module body. A deflecting member, which deflects the optical path of the focus detection light beam, is located in the aperture. A biasing member bias the deflecting member and restrains the deflecting member in a fixed location on the module body. A lens aggregate which has multiple lenses formed into a single body on the same substrate is forced against a support member in the module body to touch at contact areas. The contact areas on either the lens aggregate or the support member includes first, second and third protuberances. A first contact area opposite the first protuberance is shaped such that the first protuberance is restrained from movement in all directions lying in a plane substantially perpendicular to the direction in which the force is exerted. A second contact area opposite the second protuberance permits movement ,along only one line within the aforementioned plane. A third contact opposite the third protuberance does not restrain movement within the aforementioned plane. In an alternative embodiment, only two contact areas are provided in holes in the support member. Only two protuberances protrude from the lens aggregate and are disposed in the holes. A curable liquid filler which hardens on exposure to air is introduced into the holes around the protuberances. One of the holes is shaped to restrict all movement in a plane perpendicular to the protuberances, while the other hole permits movement along a line in the plane after the filler hardens.

45 Claims, 16 Drawing Sheets

FOCUS DETECTION DEVICE

BACKGROUND OF THE INVENTION

1. Field of the Invention

The present invention relates to a focus detection device which is used in cameras, binoculars, and other optical instruments.

2. Description of the Related Art

This application is a continuation-in-part of United States patent application Ser. No. 08/365,431, filed on Dec. 28, 1994 which is a continuation-in-part of United States patent application Ser. No. 08/212,789, filed on Mar. 15, 1994, now abandoned. FIG. 3 is a cross sectional diagram of a focus detection device in accordance with one first preferred embodiment using a phase difference detection method. FIG. 4 is an oblique exploded diagram of the focus detection device in accordance with one first preferred embodiment. FIGS. 3 and 4 show an example of a phase difference type of focus detection device (also known as a focus detection module) for use in a single lens reflex camera and the like which can be used to explain the background in which the present invention is practiced. A focus detection device FM receives subject light passing through a photographic lens (not shown) of the camera (not shown) via a sub-mirror (not shown) within the camera. A filter 101, adhesively fixed to a module body 105 in an entry portion of the focus detection module FM, cuts off infrared light. A mask member 102, adhesively fixed to the module body 105 behind the filter 101, has an aperture corresponding to a focus detection range. The filter 101 and the mask member 102 serve to hold a condensing lens 103 in place. An aperture mask 106 and a reimaging lens 104 are fixed by the compression of a plate spring 108 in the exit portion of the focus detection module FM. A CCD sensor 109 is located outside the exit portion of the focus detection device FM. Focus detection light beams, which have passed through different regions of the exit pupil of the photographic lens, are reimaged by the reimaging lens 104 onto the CCD sensor 109 as an optical image. The CCD sensor 109 outputs a signal corresponding to the imaged state of the optical image for focus detection use. The principles of the phase difference method of focus detection are described in detail in Japanese Patent Publication 5-13569.

The focus detection light beam passes through an empty portion 110 in the interior of the module body 105. A reflecting mirror 111 reflects the light exiting the condensing lens 103 to the reimaging lens 104. Because the module body 105 is an injection molded structure, an aperture 110a is disposed in the lower face of the module body 105. The aperture 110a facilitates extraction of a mold MD (shown by a double-dot chain line) about which the empty portion 110 is formed.

FIG. 9 is an oblique diagram of the lower surface side of the focus detection device as shown in FIG. 3. The reflecting mirror 111 is adhesively fixed over the aperture 110a. In order to prevent stray light, other than the focus detection light beam exiting the condensing lens 103, from being incident on the CCD sensor 109, light screening tape is affixed over the portions of the aperture 110a which are not covered by the reflecting mirror 111. This allows the interior of the module 105 to be maintained in a state somewhat approximating a dark box.

However, fixing the reflecting mirror 111 to the module body 105 causes several problems. To reduce the size of the focus detection module FM, the receiving face of the reflecting mirror 111 (the oblique line region in FIG. 9) must be minimized, which decreases the reliability of the adhesion. In particular, it is difficult to maintain a margin of adhesion surface area at the two end sides 111a of the reflecting mirror 111. Further, the angle of the reflecting mirror 111 changes with the amount of adhesive applied and the position applied. Thus, an exact mounting angle cannot be ensured. The process of applying the adhesive, obtaining uniformity of the affixing operation, fixing of the reflecting mirror 111 until the adhesive has set, and the like, take time and labor, increasing the manufacturing cost of the focus detection device.

SUMMARY OF THE INVENTION

Accordingly, it is an object of the present invention to provide a focus detection device which has good workability when mounting a deflection member in a module body, and also high reliability and increased performance.

Additional objects and advantages of the invention will be set forth in part in the description which follows, and, in part, will be obvious from the description, or may be learned by practice of the invention.

Objects of the present invention are achieved in a focus detection device comprising a focus detection optical system, a hollow module body for holding said focus detection optical system, the module body provided with an aperture, a deflecting member positioned near the aperture in the hollow body module to deflect a focus detection light beam, and a biasing member to bias said deflecting member against said hollow module body so as to secure said deflecting member.

Objects of the present invention are achieved in a focus detection device comprising a focus detection optical system, a module body for holding said focus detection optical system, the module body being provided with a hollow portion, the module body provided with an aperture at a bend in the hollow portion, a deflecting member positioned near the aperture in the hollow body module to deflect a focus detection light beam through the bend, and a plate spring to bias said deflecting member against said hollow module body so as to secure said deflecting member.

Objects of the present invention are also achieved in a focus detection unit comprising a module body provided with a hollow portion, through which a focus detection light beam passes, an aperture exterior to the module body in communication with the hollow portion, a deflecting member located in the aperture of the hollow portion for deflecting the focus detection light beam, and a biasing member biasing the deflecting member in the module body and restraining the deflecting member at a fixed location on the module body.

Objects of the present invention are also achieved in a focus detection unit comprising a module body provided with a hollow portion, through which a focus detection light beam passes, an aperture exterior to the module body in communication with the hollow portion, a deflecting member located in the aperture of the hollow portion for deflecting the focus detection light beam, and a biasing member covering at least one portion of the aperture, the biasing member biasing the deflecting member in the module body and restraining the deflecting member at a fixed location on the module body.

It is yet another object of the present invention to provide a focus detection device which has good workability when mounting a deflection member in a module body, and also high reliability and increased performance.

Additional objects and advantages of the invention will be set forth in part in the description which follows, and, in part, will be obvious from the description, or may be learned by practice of the invention.

The above objects of the present invention are attained by a lens securing structure which includes a lens unit with at least one lens, a support member to support the lens unit; and a force exerting unit to exert a force pressing the lens unit against the support member. In a first embodiment, the lens unit has three contact areas on a first surface and the support member has three contact areas on a second surface. The force exerting unit may be a plate spring which presses the contact areas on the first surface against the contact areas on the second surface. An alignment structure is preferably provided to prevent movement in a plane perpendicular to the force exerted by the force exerting unit at a first pair of the contact areas on the first and second surfaces, while permitting movement only parallel to a line within the plane at a second pair of the contact areas on the first and second surfaces and permitting movement within the plane at a third pair of the contact areas of the first and second surfaces.

A lens securing structure according to an embodiment of the present invention may be provided in a focal point detection device that detects the focal point adjustment status of a photographic lens using a distribution of multiple light quantities relating to the subject targeted for detection by the focal point detection optical device. The lens securing structure secures a housing, as the support member, to a lens aggregate, as the lens unit, at respective contact surfaces. The lens aggregate includes multiple lenses formed on a substrate of an reimaging lens that is at least one part of the focal point detection optical device. On the contact surface of the lens aggregate substrate are first through third protuberances. A plate spring coupled to the housing provides the force exerting unit which presses the contact surface of the substrate against the housing.

The first through third protuberances on the contact surface of the lens aggregate substrate and the contact surface of the housing can be formed to provide the alignment structure as follows. The first contact area on the housing has a conical cavity which is shaped to restrain the first protuberance in all directions. The second contact area on the housing is a V-shaped groove shaped to permit movement of the second protuberance only parallel to a line within a plane substantially perpendicular to the direction in which the plate spring presses. The third contact area on the housing is a planar surface which does not restrain movement of the third protuberance within the plane.

In an alternative embodiment, a lens securing structure of a focal point detection device includes a substrate having at least one lens formed therein and having first and second protuberances formed on a first surface of the substrate; a support member having a second surface facing the first surface of the substrate with first and second cavities therein, the first and second protuberances on the substrate disposed in the first and second cavities, respectively, with spaces therebetween; a force exerting unit to exert a force pressing the substrate against the support member; and a filler injected as a curable fluid and cured in the spaces between the first and second cavities and the first and second protuberances, respectively.

Objects of the present invention are also achieved in a focus detection device comprising a focus detection optical system, a hollow module body for holding said focus detection optical system, the module body provided with an aperture, a deflecting member positioned near the aperture in the hollow body module to deflect a focus detection light beam, and a biasing member to bias said deflecting member against said hollow module body so as to secure said deflecting member.

Objects of the present invention are achieved in a focus detection device comprising a focus detection optical system, a module body for holding said focus detection optical system, the module body being provided with a hollow portion, the module body provided with an aperture at a bend in the hollow portion, a deflecting member positioned near the aperture in the hollow body module to deflect a focus detection light beam through the bend, and a plate spring to bias said deflecting member against said hollow module body so as to secure said deflecting member.

Objects of the present invention are also achieved in a focus detection unit comprising a module body provided with a hollow portion, through which a focus detection light beam passes, an aperture exterior to the module body in communication with the hollow portion, a deflecting member located in the aperture of the hollow portion for deflecting the focus detection light beam, and a biasing member biasing the deflecting member in the module body and restraining the deflecting member at a fixed location on the module body.

Objects of the present invention are also achieved in a focus detection unit comprising a module body provided with a hollow portion, through which a focus detection light beam passes, an aperture exterior to the module body in communication with the hollow portion, a deflecting member located in the aperture of the hollow portion for deflecting the focus detection light beam, and a biasing member covering at least one portion of the aperture, the biasing member biasing the deflecting member in the module body and restraining the deflecting member at a fixed location on the module body.

Objects of the present invention are also achieved in a focus detection unit comprising a module body provided with a hollow portion, through which a focus detection light beam passes, an aperture exterior to the module body in communication with the hollow portion, a deflecting member located in the aperture of the hollow portion for deflecting the focus detection light beam, a biasing member biasing the deflecting member in the module body and restraining the deflecting member at a fixed location an the module body, and a reimaging lens which causes an optical image for focal point detection use to be reimaged on a sensor in the module body, the said reimaging lens is biased by means of the biasing member in the module body.

Objects of the present invention are also achieved in a focus detection unit comprising a module body provided with a hollow portion, through which a focus detection light beam passes, an aperture exterior to the module body in communication with the hollow portion, a deflecting member located in the aperture of the hollow portion for deflecting the focus detection light beam, and a plate spring biasing the deflecting member in the module body and restraining the deflecting member at a fixed location on the module body.

Objects of the present invention are also achieved in a focus detection unit comprising a module body provided with a hollow portion, through which a focus detection light beam passes, an aperture exterior to the module body in communication with the hollow portion, a deflecting member located in the aperture of the hollow portion for deflecting the focus detection light beam, and a plate spring biasing the deflecting member in the module body and restraining the deflecting member at a fixed location on the module body, the plate spring being equipped with a pressure contact portion which compresses the modular body with an elastic restoring force at the time of installation to the module body, and a pair of cooperating portions disposed between a pressure contact portion and the module body, to cooperate with respect to the module body in a detaching direction of the said plate spring.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
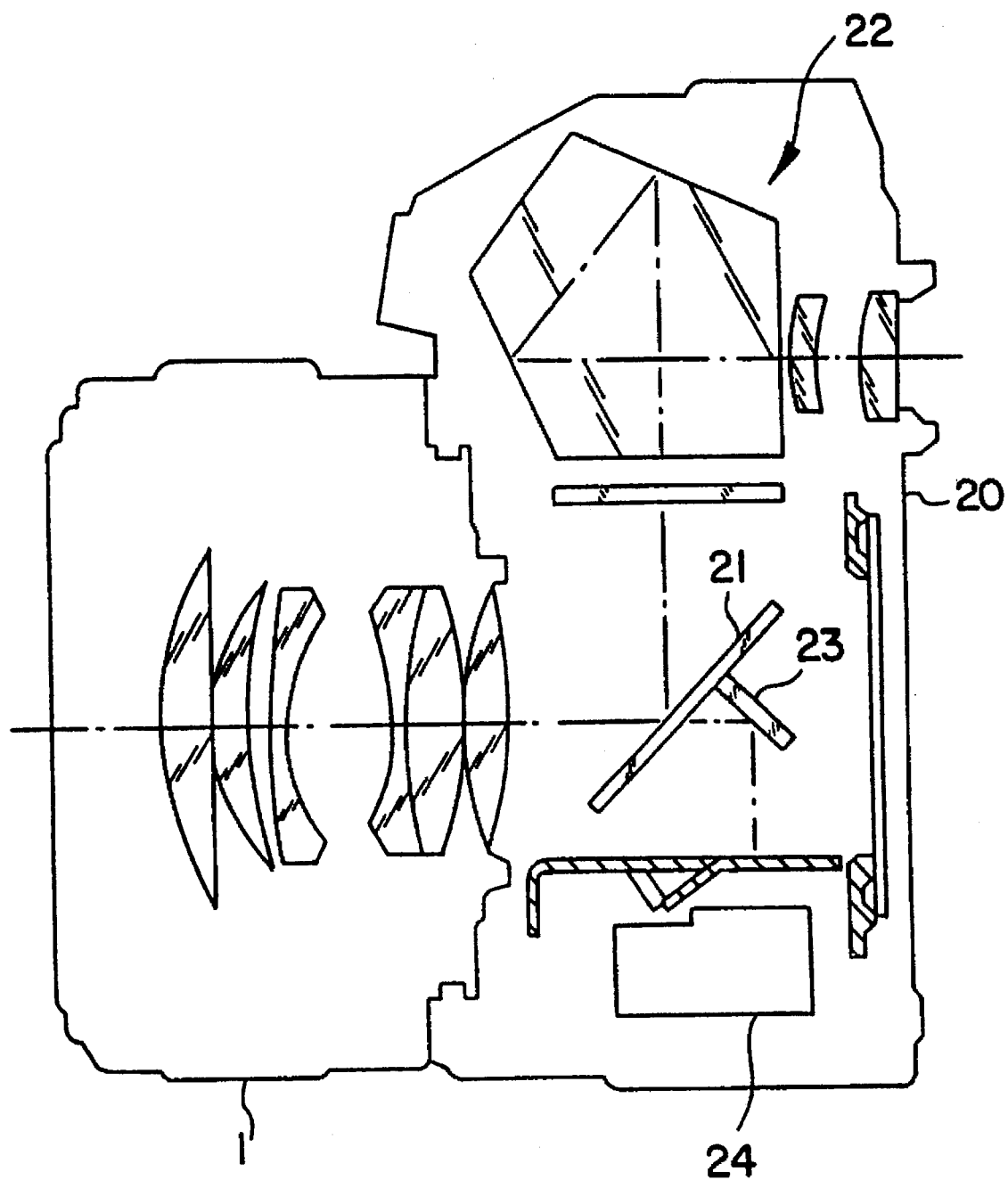
FIG. 1 is a cross sectional diagram of a camera having a focus detection device in accordance with the preferred embodiments of the present invention.

Reference will now be made in detail to the present preferred embodiments of the present invention, examples of which are illustrated in the accompanying drawings, wherein like reference numerals refer to like elements throughout.

FIG. 1 is a cross sectional diagram of a camera having a focus detection device in accordance with the preferred embodiments of the present invention. A camera body 20 is provided with a photographic lens 1 detachably affixed to a front surface of the camera body 20. A photographic light beam (shown by a single-dot chain line) arriving from the subject passes through the photographic lens 1 and arrives at a main mirror 21. A portion of the photographic light beam is reflected upwards and passes into a viewfinder optical system 22. A portion of the photographic light beam arriving at the main mirror 21 passes through the main mirror 21 and is reflected downwards by a sub-mirror 23 onto a focus detection module 24 as a focus detection light beam.

Figure 2:
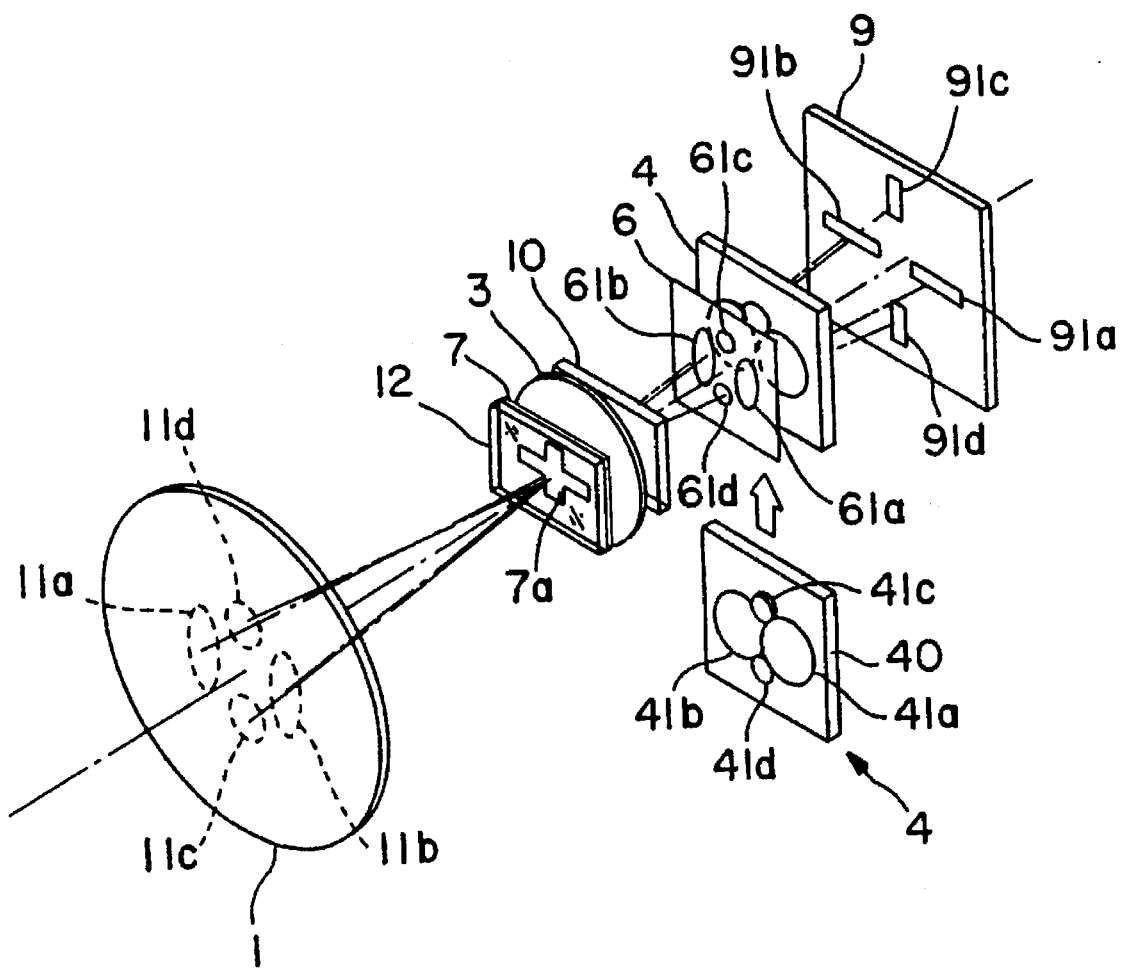
FIG. 2 is an exploded perspective view of a focus detection optical system for use in a focus detection device in accordance with the preferred embodiments of the present invention.

FIG. 2 is an exploded perspective view of a focus detection optical system for use in a focus detection device in accordance with the preferred embodiments of the present invention. A mask member 7 is retained by a cover glass 12. The mask member 7 is provided with a cross-shaped aperture 7a defining a focus detection field. The mask member 7, performs the function of a so-called visual field mask. A condenser lens 3, an infrared cutoff filter 10, and a reimaging lens 4 are arranged, in order, rearward of the mask member 7. The reimaging lens 4 is integrally formed by four lens pieces 41a, 41b, 41c and 41d, paired vertically and horizontally on a base plate 40. The base plate 40 is made of plastic. A reflecting mirror (not shown) is arranged between the condenser lens 3 and the reimaging lens 4 to deflect the light path of the focus detection light beam. An aperture mask 6, is located on the front surface of the reimaging lens 4. The aperture mask 6 is formed of light screening material and has four apertures 61a, 61b, 61c and 61d, arranged about a central portion, corresponding to the lens pieces 41a–41d of the reimaging lens 4. An image sensor 9 has four sensor arrays 91a, 91b, 91c and 91d, paired vertically and horizontally, corresponding to the lens pieces 41a–41d of the reimaging lens 4. The image sensor 9 outputs a signal corresponding to the light quantity distribution of the images on the surfaces of each of the sensor arrays 91a–91d.

The focus detection module 24 (see FIG. 1) is located rearward of a plane optically equivalent to a predetermined focal plane of the photographic lens 1, i.e. the film plane. The condenser lens 3 projects the image of the apertures 61a–61d of the aperture mask 6 in the vicinity of an exit pupil surface of the photographic lens 1. Light beams passing through the regions 11a, 11b, 11c and 11d join a subject image in the neighborhood of a plane which is optically equivalent to the film plane. The light beams from the subject which have passed through the regions 11a and 11b pass in sequence through the cover glass 12, the aperture 7a of the mask member 7, the condenser lens 3, and the infrared cutoff filter 10. From the apertures 61a and 61b of the aperture mask 6 the light beams are incident on the lens pieces 41a and 41b of the reimaging lens 4. The subject images are reimaged on the sensor arrays 91a and 91b of the image sensor 9. Based on the signal output by the image sensor 9 and corresponding to the light quantity distribution of the subject images on the sensor arrays 91a and 91b, the distances of the subject images on the sensor arrays 91a and 91b are calculated by a CPU (not shown). Based on the contrast, in the horizontal direction of the subject, the focus displacement amount of the photographic lens 1 is detected.

On the other hand, the light beams from the subject passing through the regions 11c and 11d of the photographic lens 1 pass in succession through the cover glass 12, the aperture 7a of the mask member 7, the condenser lens 3, and the infrared cutoff filter 10. From the apertures 61c and 61d of the aperture mask 6 the light beams are incident on the lens pieces 41c and 41d of the reimaging lens 4. Then, the subject images for use in focus detection are reimaged on the sensor arrays 91c and 91d of the image sensor 9. Based on the signal output by the image sensor 9, and corresponding to the light quantity distribution of the subject images on the sensor arrays 91c and 91d, the distances of the subject images on the sensor arrays 91c and 91d are calculated by the CPU. Based on the contrast, in the vertical direction of the subject, the focus displacement amount of the photographic lens 1 is detected. The focus detection principle set forth above is termed the phase difference method, and is described in detail, for example, in Japanese Patent Publication 5-16569. The cover glass 12 may be omitted. Also, if the cover glass is covered by an anti-reflection film, ghost light, reflected at the upper surface or lower surface of the condenser lens 3, reflected at the upper surface or lower surface of the cover glass 12, and incident on the sensor arrays 91a–91d, is reduced and the accuracy of focus detection is increased.

Figure 3:
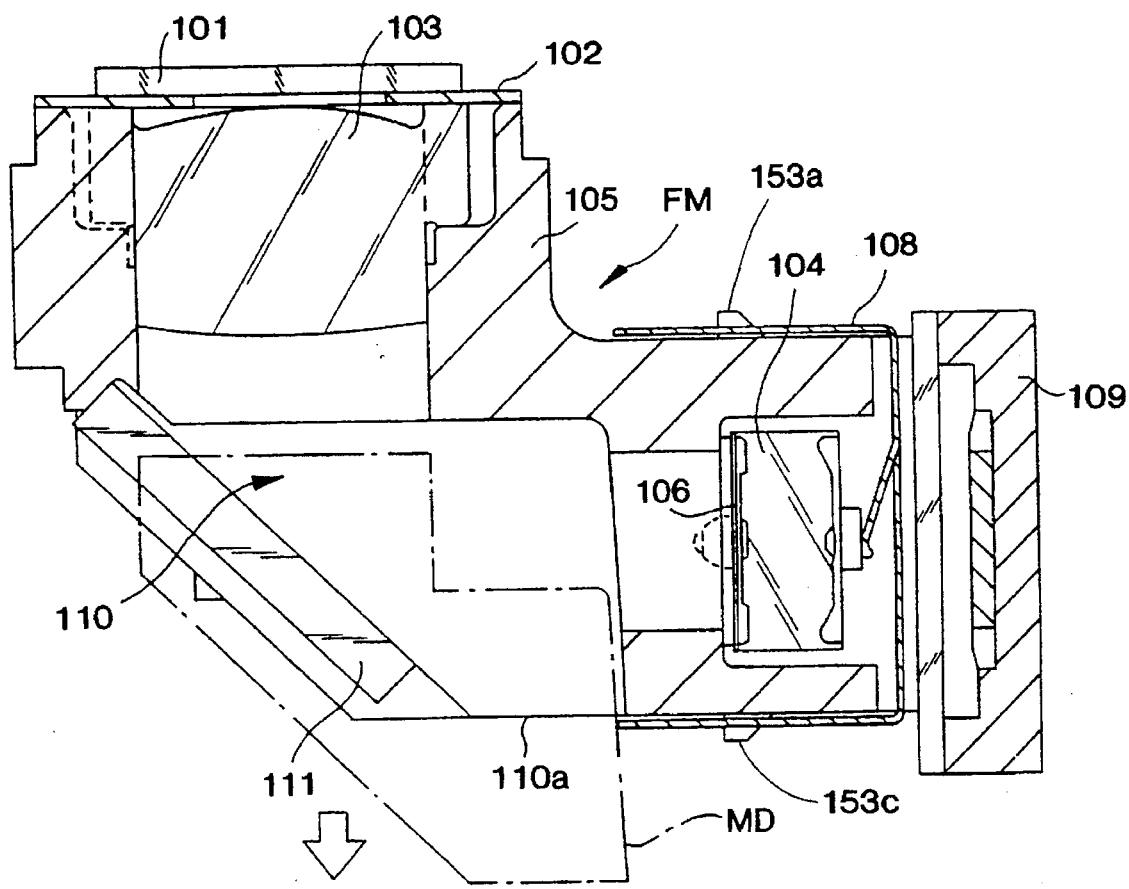
FIG. 3 is a cross sectional diagram of a focus detection device using a phase difference detection method in accordance with a first preferred embodiment of the present invention.
Figure 4:
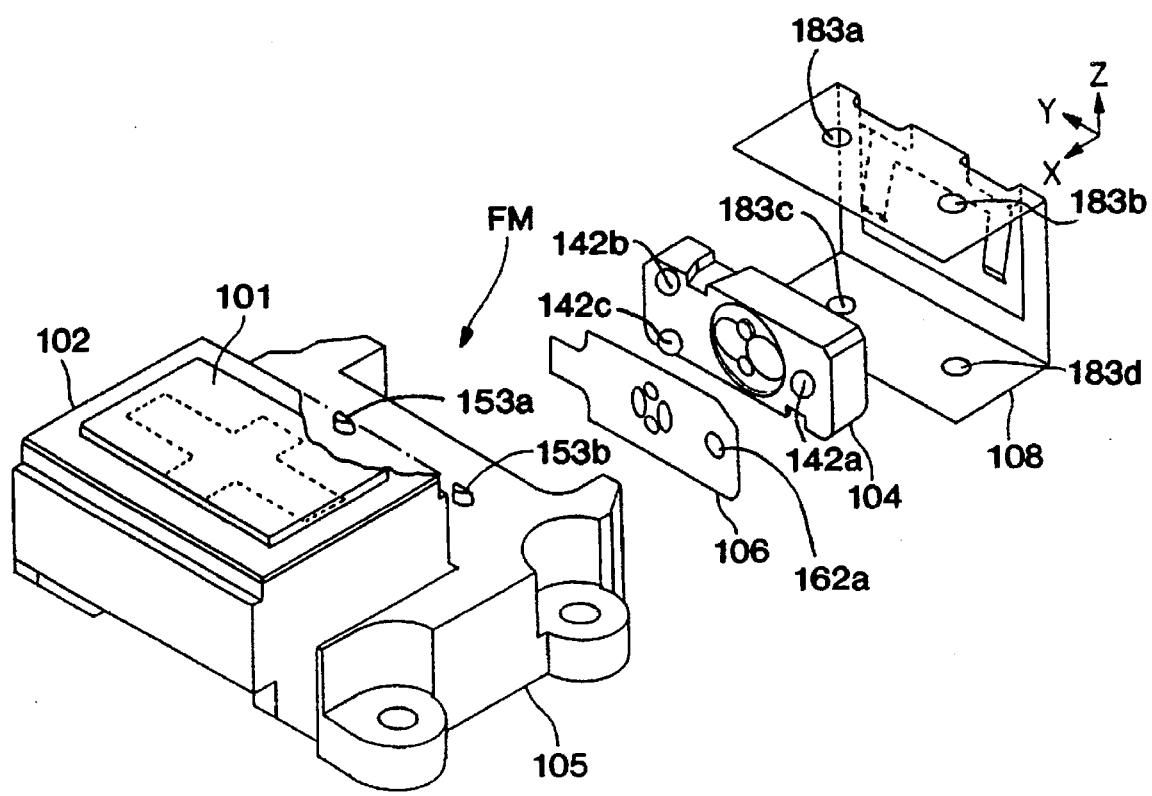
FIG. 4 is an oblique exploded diagram of the focus detection device in accordance with the first preferred embodiment of the present invention.

FIG. 3 is a cross sectional diagram of a focus detection device using a phase difference detection method in accordance with a first preferred embodiment of the present invention. FIG. 4 is an oblique exploded diagram of the focus detection device in accordance with the first preferred embodiment of the present invention. FIGS. 3 and 4 show an example of a phase difference type of focus detection device (also known as a focus detection module) for use in a single lens reflex camera and the like. A focus detection device FM receives subject light passing through a photographic lens (not shown) of the camera (not shown) via a sub-mirror (not shown) within the camera. A filter 101, adhesively fixed to a module body 105 in an entry portion of the focus detection module FM, cuts off infrared light. A mask member 102, adhesively fixed to the module body 105 behind the filter 101, has an aperture corresponding to a focus detection range. The filter 101 and the mask member 102 serve to hold a condensing lens 103 in place. An aperture mask 106 and a reimaging lens 104 are fixed by the compression of a plate spring 108 in the exit portion of the focus detection module FM. The reimaging lens 104 has three protuberances 142a, 142b and 142c, all of which have hemispherical ends. The plate spring 108 is provided with round holes 183a–183d which, when the spring plate 108 is mated with the module body 105, match protuberances 153a–153d on the module body 105. A CCD sensor 109 is located outside the exit portion of the focus detection device FM. Focus detection light beams, which have passed through different regions of the exit pupil of the photographic lens, are reimaged by the reimaging lens 104 onto the CCD sensor 109 as an optical image. The CCD sensor 109 outputs a signal corresponding to the imaged state of the optical image for focus detection use. The principles of the phase difference method of focus detection are described in detail in Japanese Patent Publication 5-13569.

The focus detection light beam passes through an empty portion 110 in the interior of the module body 105. A reflecting mirror 111 reflects the light exiting the condensing lens 103 to the reimaging lens 104. Because the module body 105 is an injection molded structure, an aperture 110a is disposed in the lower face of the module body 105. The aperture 110a facilitates extraction of a mold MD (shown by a double-dot chain line) about which the empty portion 110 is formed.

Figure 5:
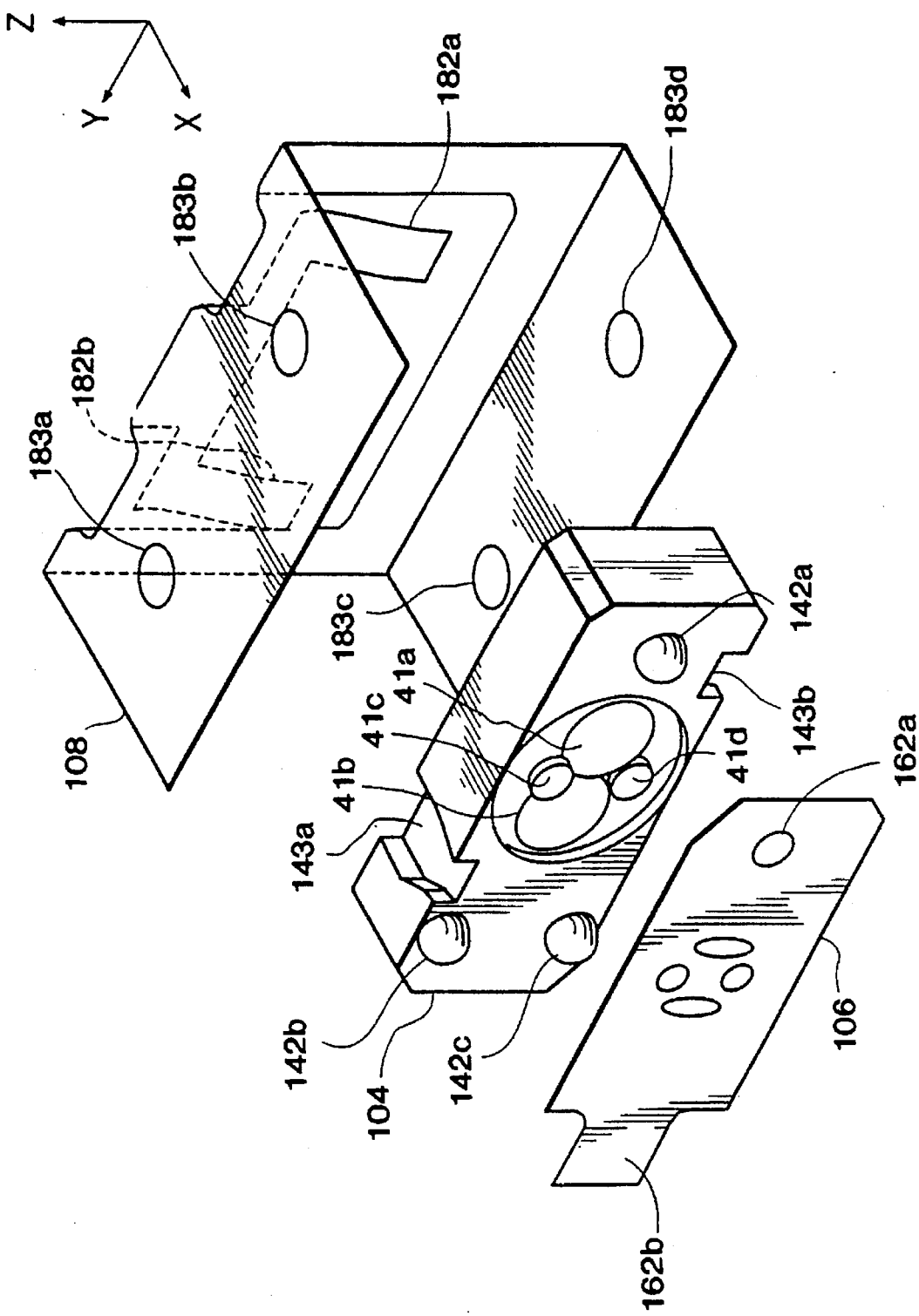
FIG. 5 is an exploded perspective view of part of FIG. 4.
Figure 6:
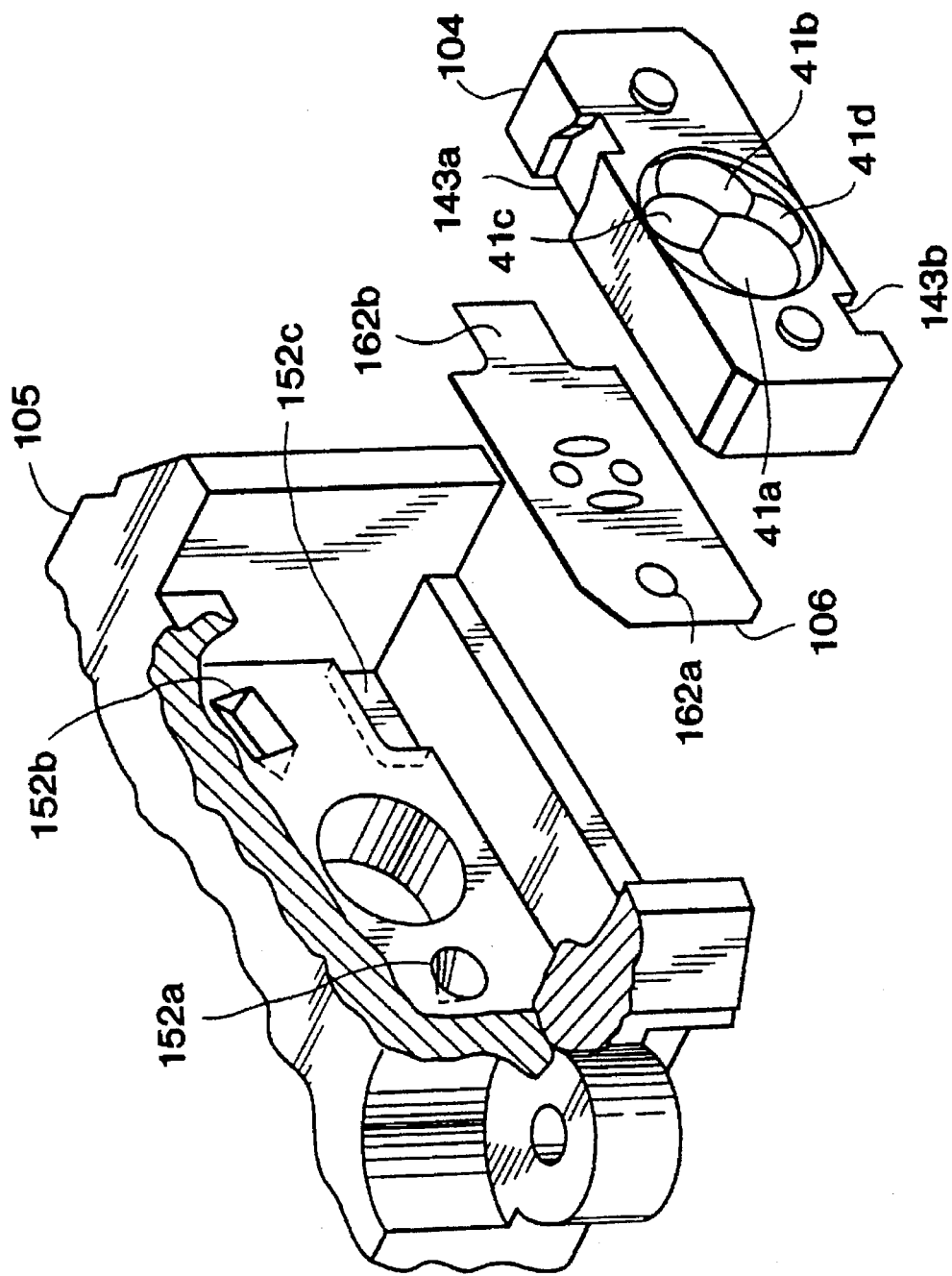
FIG. 6 is an exploded perspective view of part of FIG. 4 from a different angle than FIG. 5.

FIG. 5 is an exploded perspective view of part of FIG. 4. FIG. 6 is an exploded perspective view of part of FIG. 4 from a different angle than FIG. 5. To assemble this portion of the focus detection module 24, first, the aperture mask 106 is affixed to the reimaging lens 104 so that the protuberance 142a passes through a round hole 162a in the aperture mask 106 and a tab 162b is positioned between the remaining two protuberances 142b and 142c. In this state, a high viscosity adhesive such as an epoxy is applied to flow into and harden in grooves 143a and 143b provided on the top and bottom surfaces of the reimaging lens 104. The reimaging lens 104 is preferably formed of a resin with low moisture absorption properties, such as a certain kind of polyolefin group. The adhesives which manifest a sufficient adhesive strength with this group are limited, and an adhesive with the best adhesive properties for the aperture mask 106 is preferred. The reason for this is that the adhesive conforms to the shape of grooves 143a and 143b and hardens in a wedge shape to prevent separation of the aperture mask 106 from the reimaging lens 104.

Once the aperture mask 106 has been secured on the reimaging lens 104 as described above, the reimaging lens 104 is inserted in the module body 105. A conical cavity 152a, a V-shaped groove 152b, and a plane 152c are provided in module body 105 as shown in FIG. 6 to receive or make contact with protuberances 142a, 142b and 142c, respectively. To attach the plate spring 108 to the module body 105, round holes 183a and 183b on top of the plate spring 108 are pulled onto protuberances 153a and 153b on the upper surface of the module body 105 and round holes 183c and 183d on the bottom are pulled onto the two protuberances on the bottom of the module body 105. When the plate spring 108 is attached in this manner, tongue-shaped cantilevered parts 182a and 182b of the plate spring 108 exert a force on the reimaging lens 104 to hold it in the module body 105.

The force exerted by the plate spring 108 pushes the protuberance 142a in the direction of the optical axis (the X direction) and thus, into the conical cavity 152a, and as a result, the protuberance 142a is restricted from movement in a plane perpendicular to the optical axis (parallel to the YZ plane). Moreover, the protuberance 142b is pushed by the force exerted by the plate spring 108 into the V-shaped groove 152b, so that the protuberance 142b can move only in the direction of the groove 152b. On the other hand, the protuberance 142c is maintained in contact with the plane 152c by the force exerted by the plate spring 108, so that the protuberance 142c is not restricted in any particular direction within the YZ plane. For this reason, even if a variation from the design values is produced in the relative positions of these three protuberances by a manufacturing error, assembly is still possible. Second, even if the reimaging lens 104 expands at a rate that differs from the module body 105 because of temperature fluctuations, the protuberances 142b and 142c will only move parallel to the YZ plane while maintaining contact with the respective contact areas of the V-shaped groove 152b and the plane 152c. That is, for example, the reimaging lens 104 will not float up from the module body 105, nor will stress parallel to the YZ plane exerted on the reimaging lens 410 cause it to creep. When the temperature returns to a previous point, the gap for the lens pieces will return to the original value instead of producing a different gap as sometimes occurs in the prior art.

The effects of changes in temperature on a focal point detection module referred to above requires a little more explanation. In the focal point detection module, when the gap between the lens parts 41a and 41b of reimaging lens 104 changes, a focal point detection error is produced in relation to the distribution of luminance of the image in the horizontal direction (the Y direction in FIG. 5) and when the gap between lens parts 41c and 41d changes, an error is produced in relation to the vertical direction (the Z direction in FIG. 5). Thus, when stresses are caused by different rates of thermal expansion and contraction as described above, errors will be produced by changes in gaps between the lens pieces due to temperature changes. In addition, occasional changes in the gap based on thermal expansion can be canceled by having the CPU compensate its calculation results based on temperature detected by a temperature sensor provided within the camera. Moreover, movement of the gaps by changes in humidity are eliminated by molding the reimaging lens 104 out of a resin with low moisture absorption properties that experiences almost no dimensional changes accompanying the absorption of moisture and subsequent dehydration.

In the preferred embodiment, the V-shaped groove 152b is oriented along a straight line passing through the conical cavity 152a. As a result, even if the gap between the protuberances 142a and 142b fluctuates due to thermal expansion, rotational movement within the YZ plane is prevented. This prevents a focal point detection error when the subject has a pattern with a slanted edge shape.

If one assumes that the V-shaped groove 152b and the plane 152c have become deformed by creep to match the shape of their corresponding contact areas, the protuberance 142b and the protuberance 142c, those deformed parts become cavities and the position of each protuberance that fits into them is restricted in the same YZ plane as the protuberance 142a which contacts the conical cavity 152a. If this happens, the final result will be that the advantage of stress not being produced parallel to the YZ plane due to temperature changes as previously described would be lost because the three protuberances would become fixed in positions within the YZ plane. In contrast, this kind of problem does not arise if the opposite occurs and the protuberances 142a, 142b and 142c deform to match the corresponding the contact areas 152a, 152b and 152c of the module body 105. Thus, by adding fiberglass chips, the module body 105 is preferably made more difficult to deform than the reimaging lens 104. In this way, it is difficult to lose the aforementioned advantage by deformation of the contact areas due to creep, etc.

In the preferred embodiments, the force that pushes the reimaging lens 104 into the module body 105 exerted by the tongue-shaped cantilevered parts 182a and 182b of plate spring 108 is applied to all three protuberances 142a, 142b and 142c. Referring to the forces applied to these protuberances as f1, f2 and f3 respectively, these component forces shall be considered. When contact areas are considered in more detail, it is seen that the contact between the protuberance 142a and the conical cavity 152a is a circle and force f1 is exerted against this circle. In contrast to this, it can be said that force f2 is exerted against two points where the protuberance 142b and the V-shaped groove 152b make contact and that force f3 is received at approximately one point in the same way. Consequently, if forces f1, f2 and f3 are equal, the concentrated stress applied to the real contact part of the protuberance 142c is larger than that of the protuberance 142b, and that of the protuberance 142a is correspondingly smaller than that of the other two. For this reason, the amount of deformation of the three protuberances is likely to differ and as a result, the reimaging lens 104 will tend to incline with respect to the YZ plane or become less perpendicular to the X-axis.

If this were only a phenomenon of elastic deformation, it would have little effect, but when relatively high temperatures are maintained over a long period of time in this state, creep deformation appears. The amount of deformation, and consequently, the amount of inclination becomes larger over time, and a focal point detection error is produced that cannot be ignored. This is avoided in the first embodiment, because the force exerted by the tongue-shaped cantilevered part 182a is nearly all transferred to force f1, and the force exerted by the tongue-shaped cantilevered part 182b is split nearly evenly between forces f2 and f3. As a result, the first embodiment has a configuration such that forces f2 and f3 are weaker than force f1, and this concern about focal point detection error in relation to the distribution of luminance of the image in the horizontal direction (the Y direction) is reduced. In general, it is best to reduce the focal point detection error in relation to the distribution of luminance of the image in the vertical direction (the Z direction in the FIG.) by configuring the device such that f1>f2>f3.

Although the first embodiment of the present invention has been described with respect to a specific configuration, it will be recognized that the first embodiment is not limited to the specific configuration. For example, the present invention are not limited to materials with low moisture absorption properties as in the first and second embodiments and, in general, both the reimaging lens 104 and the module body 105 can be made of materials which have problems in adhesive properties during practical use. As a result, the degree of freedom in the selection of materials is increased, thereby improving performance of the focal point device. Also, the present invention is not limited to the reimaging lens of the focal point detection module, and can be broadly applied to lens aggregates for uses in which the recovery of gap changes in multiple lens pieces formed on a single substrate is highly desirable.

Figure 7:
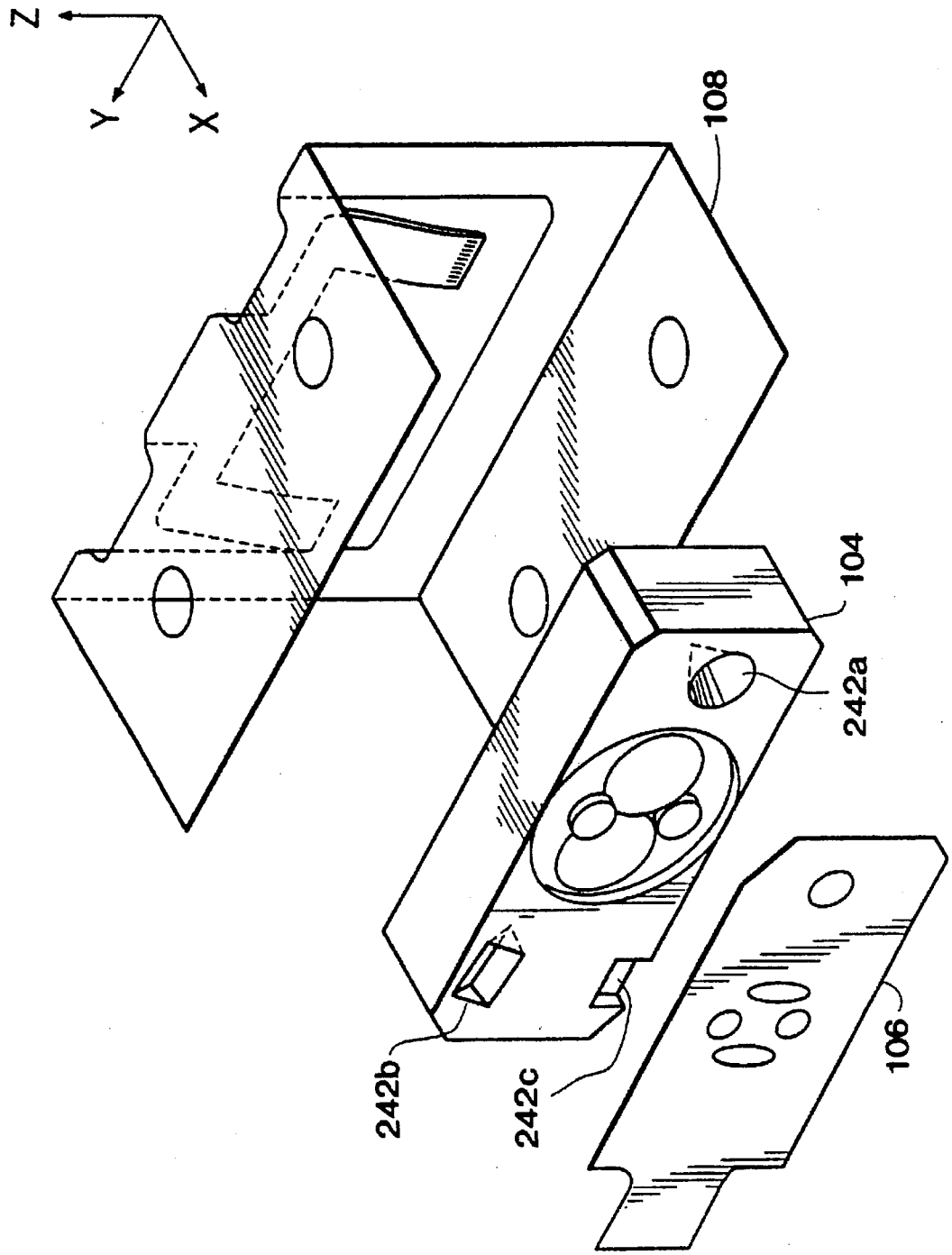
FIG. 7 is an exploded perspective view of a lens securing structure of a focal point detection device according to a second embodiment of the present invention.
Figure 8:
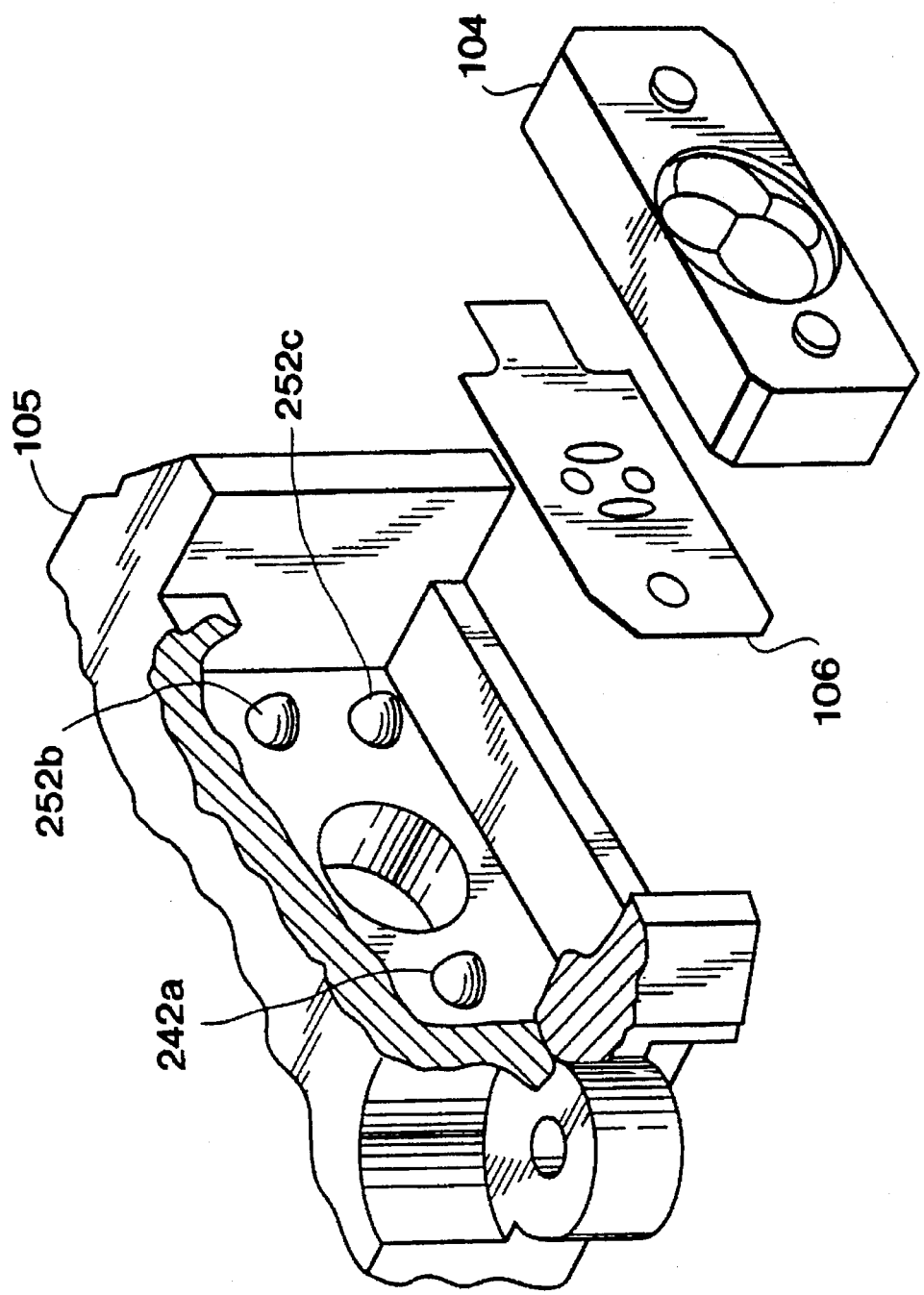
FIG. 8 is an exploded perspective view of the second embodiment from a different angle than FIG. 7.

FIG. 7 is an exploded perspective view of a lens securing structure of a focal point detection device according to a second embodiment of the present invention. FIG. 8 is an exploded perspective view of the second embodiment from a different angle than FIG. 7. In the first embodiment above, the three protuberances were provided on the reimaging lens 104 and the three kinds of contact areas corresponding to the protuberances were provided on module body 105, but the reverse of this is also possible. Specifically, a structure may also be used in which the protuberances are provided on the module body 105 and the three kinds of contact parts are provided on the reimaging lens. The second embodiment illustrated in FIGS. 7 and 8 is this kind of reverse structure, and except for the fact that they are reversed from the above description, the structure and the functions are the same as in the first embodiment. However, because the aperture mask 106 is affixed to the module body 105, there is nothing in the reimaging lens 104 or in the module body 105 that corresponds to the grooves 143a and 143b in the first embodiment.

The reimaging lens 104 has many restrictions in terms of its optical characteristics such as high transmittance. As a result, it is not possible to intentionally strengthen the lens structure by additives as was done for the module body 105 in the first embodiment. Consequently, the reverse structure of the second embodiment appears to be less desirable to the first embodiment in that deformation of the contact parts caused by creep, etc., can cause errors in the optical characteristics of the reimaging lens 104.

However, the reverse structure of the second embodiment is superior to the first embodiment in another way. In both the first and second embodiments, it is necessary for the surfaces of the three protuberances and the contact areas corresponding thereto to be smooth to fulfill their functions.

Consequently, the surfaces of the protuberances and the corresponding contact areas must not be damaged during manufacturing processes, such as movement, storage and assembly of these parts. In particular, the first embodiment can be more easily damaged due to the exposure of the protuberances. For example, when placing the reimaging lens 104 before it is finished on a horizontal surface such as a table top, there would be the concern that if the side with the protuberances 142a, 142b and 142c were placed face down, the protuberances may be damaged by contact with the horizontal surface. Also, the protuberances 142a–142c could be easily damaged by friction with some other object during handling, such as tools and other parts. Therefore, particular caution is required in the handling of the reimaging lens 1044 of the first embodiment.

In contrast to this, in the reverse structure of the second embodiment, protuberances 252a, 252b and 252c are located deep in module body 105, and they are difficult to damage. Moreover, because all of the contact surfaces of the cylindrical cavity 242a, the V-shaped groove 242b and the plane 242c are recessed, they are not as easily damaged on the reimaging lens 104 as the protuberances 142a–142c of the first embodiment. Consequently, particular caution is not required during handling to protect the surfaces of the protuberances or the contact areas in the second embodiment. In this way, the advantage of the second embodiment is that it is comparatively easy to handle the parts.

For both the first embodiment and the second embodiment above, the reimaging lens 104 can be secured in the module body 105, due to the pressure exerted by the plate spring 108 on the reimaging lens 104, without being affixed to another object and without reduced operability over time. Consequently, materials with low moisture absorption properties, as described above, can be used irrespective of the difficulties in adherence. Because of this, there is no difference between the two embodiments in the fact that a focal point detection module can be obtained which is affected very little by humidity changes.

Although the second embodiment Of the present invention has been described with respect to a specific configuration, it will be recognized that the second embodiment is not limited to the specific configuration. For example, the present invention are not limited to materials with low moisture absorption properties as in the first and second embodiments and, in general, both the reimaging lens 104 and the module body 105 can be made of materials which have problems in adhesive properties during practical use. As a result, the degree of freedom in the selection of materials is increased, thereby improving performance of the focal point device. Also, the present invention is not limited to the reimaging lens of the focal point detection module, and can be broadly applied to lens aggregates for uses in which the recovery of gap changes in multiple lens pieces formed on a single substrate is highly desirable.

The distinguishing feature is that, because it is not necessary for the material of the lens aggregate to have good adhesiveness, there is the effect that the freedom in the selection of materials can be expanded and the performance of the focal point detection device which uses the aforementioned lens aggregate can be improved. Also, because the second and third protuberances can slide while in contact with their corresponding contact areas, even if the lens aggregate and the support members expand and contract relative to each other because of temperature fluctuations, there is the effect that positional instability, such as the lens aggregate warping and floating up from the support member, can be prevented. In addition, because no heat stress is applied in a direction to change the lens gap, there is the effect that creep deformation is prevented and recovery of the lens gap when returning to the original temperature can be guaranteed.

In a lens securing structure of a focal point detection device according to either of the first and second embodiments, the first through third protuberances 142a, 142b, and 142c that are provided on either one of the reimaging lens 104 or the module body 105 make contact with the conical cavity 152a, the V-shape groove 152b, and the plane 152c, respectively, that are provided, and the reimaging lens 104 is pressed onto the module body 105 by the plate spring 108. Therefore, the reimaging lens 104 can freely expand and contract even if the reimaging lens 104 expands at a heat expansion rate different from that of the module body 105 due to temperature fluctuation in particular, and the reproducibility of the distances between lens pieces when under the influences of temperature fluctuations is good. Furthermore, the position of the reimaging lens 104 does not move in a rotational direction as a result of expansion and contraction. Consequently, a focal point detection device with a favorable focal point detection accuracy under various temperatures can be achieved by compensating, through calculation, for the influences of change in the distances between lens pieces.

Figure 9:
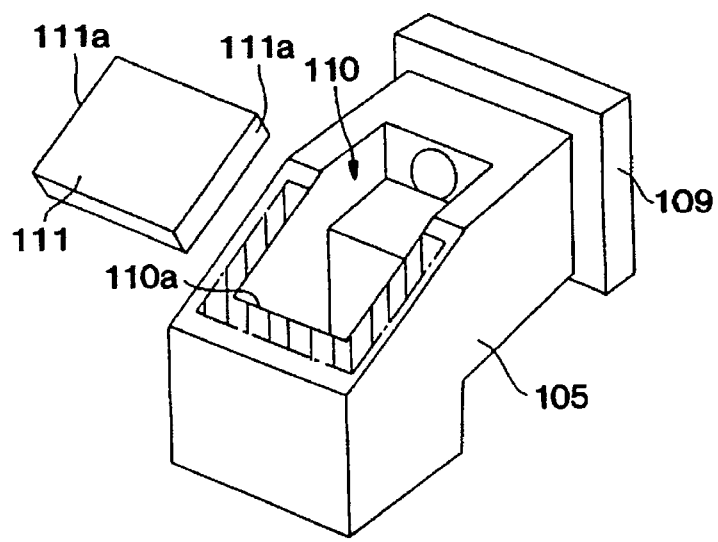
FIG. 9 is an oblique diagram of the lower surface of the focus detection device as shown in FIG. 3.

FIG. 9 is an oblique diagram of the lower surface side of the focus detection device as shown in FIG. 3. The reflecting mirror 111 is adhesively fixed over the aperture 110a. In order to prevent stray light, other than the focus detection light beam exiting the condensing lens 103, from being incident on the CCD sensor 109, light screening tape is affixed over the portions of the aperture 110a which are not covered by the reflecting mirror 111. This allows the interior of the module 105 to be maintained in a state somewhat approximating a dark box.

However, fixing the reflecting mirror 111 to the module body 105 causes several problems. To reduce the size of the focus detection module FM, the receiving face of the reflecting mirror 111 (the oblique line region in FIG. 14) must be minimized, which decreases the reliability of the adhesion. In particular, it is difficult to maintain a margin of adhesion surface area at the two end sides 111a of the reflecting mirror 111. Further, the angle of the reflecting mirror 111 changes with the amount of adhesive applied and the position applied. Thus, an exact mounting angle cannot be ensured. The process of applying the adhesive, obtaining uniformity of the affixing operation, fixing of the reflecting mirror 111 until the adhesive has set, and the like, take time and labor, increasing the manufacturing cost of the focus detection device.

Figure 10:
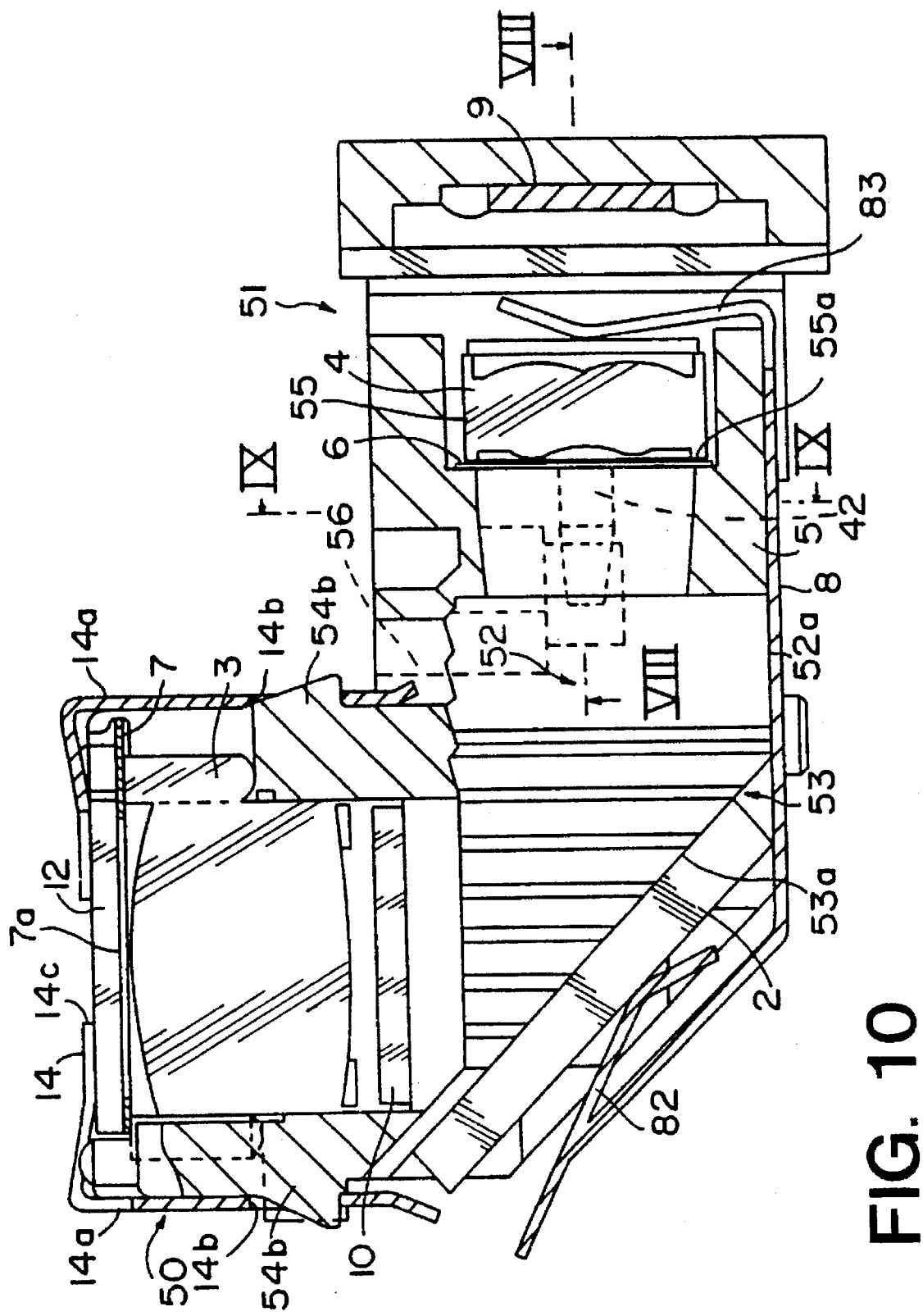
FIG. 10 is a cross sectional diagram of a focus detection device in accordance with a third preferred embodiment of the present invention.

FIG. 10 is a cross sectional diagram of a focus detection device in accordance with a third preferred embodiment of the present invention. A reflecting mirror 2 is positioned in a module body 5. The module body 5 is a plastic injection molded article. The infrared cutoff filter 10, condenser lens 3, mask member 7 and cover glass 12 are mounted in an entry portion 50 of the module body 5. The aperture mask 6, reimaging lens 4 and image sensor 9 are mounted in an exit portion 51 of the module body 5. An empty portion 52, or hollow portion, through which the focus detection light passes, is formed in the interior of the module body 5. An aperture 52a, for extraction of the mold of the hollow portion after injection molding, is formed in a lower surface of the module body. An angular portion 53, between the entry portion 50 and the exit portion 51, is formed obliquely inclined to the direction of light incident on the condenser lens 3. A face surface 53a of the reflecting mirror 2 is arranged on the angular portion 53. Moreover, the face surface 53a is of the same configuration as the shaded region of FIG. 9. Because the light beam for use in focus detection is directed by the reflecting mirror 2 to the predetermined location of the reimaging lens 4, when an error arises in the mounting angle of the reflecting mirror 2, the positional relationship of the reimaging lens 4 and the aperture mask 6 on the one side, and the condenser lens 3 and the mask member 7 on the other side, is displaced from the design location, and focus detection errors arise. A mounting hole 55 is provided with a receiving surface 55a to receive the reimaging lens 4. The reimaging lens 4 in provided with a pair of bosses 42 (only one shown). A concave portion 56, described hereinafter, is also provided in the module body 5.

The reflecting mirror 2 and the reimaging lens 4 are biased by a plate spring 8 toward the receiving surfaces 53a and 55a, respectively, of the module body 5. The plate spring 8 has a pair of bent portions 81 for receiving the module body 5. The plate spring 8 has a pair of mirror compression portions 82 (only one shown) which bias the mirror 2, and a pair of lens compression portions 83 (only one shown) which bias the reimaging lens 4.

The infrared cutoff filter 10, condenser lens 3, mask member 7 and cover glass 12 are compressively fixed in the module body 5 by means of a compression member 14. The compression member 14 is mounted on the module body 5 by inserting the entry portion 50 of the module body 5 between a pair of bent portions 14a. By fitting a protuberance 54b of the module body 5 with a mounting hole 14b, disposed in the bent portion 14a, the compression member 14 is held to the module body 5. Moreover, a cross shaped aperture 14c, somewhat larger than the aperture 7a of the mask member 7, is formed in the compression member 14.

Figure 11:
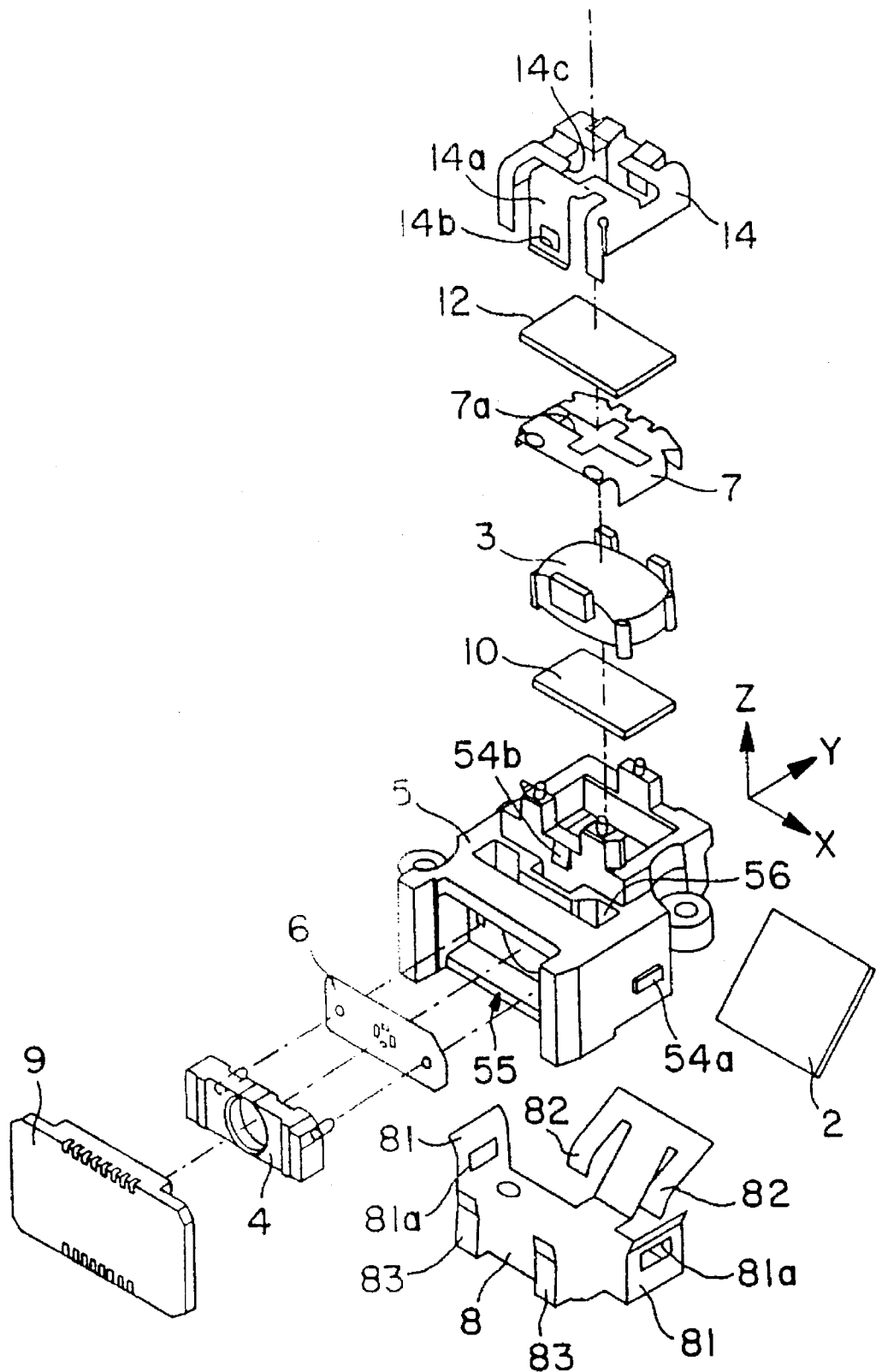
FIG. 11 is an exploded perspective view of a focus detection device in accordance with the third preferred embodiment of the present invention.

FIG. 11 is an exploded perspective view of a focus detection device in accordance with a third preferred embodiment of the present invention. Mounting holes 81a of square shape are disposed on the bent portions 81 of the spring plate 8. A pair of matching protuberances 54a (only one shown), are formed on the module body 5 to fit into the mounting holes 81a. When the plate spring 8 is fitted on from the lower surface of the module body 5, the pair of bent portions 81 ride up over the protuberances 54a and are pressed apart. When the locations of the mounting holes 81a and the protuberances 54a meet, the protuberances 54a fit into the mounting holes 81a. In this state, the bent portions 81 deform elastically to the outer sides of the module body 5, and the bent portions 81 and the module body 5 are firmly biased together, preventing the detachment of the plate spring 8. The aperture 52a of the module body 5 is covered by the plate spring 8.

Advantageously, the reimaging lens 4 is biased by the plate spring 8 without being adhered to the module body 5. In order to reduce focus detection errors due to moisture absorption and drying, the reimaging lens 4, is preferably manufactured with particularly low moisture absorption material, for example amorphous polyolefin resins (trade name Zeonex). The only adhesives which can be used are limited to those which manifest sufficient adhesive strength with respect to such resins. The available adhesives are further limited by conditions of workability and the like. Thus, adhering a reimaging lens 4 to the module body 5 is practically impossible.

To assemble the focus detection module 24, the aperture mask 6 and the reimaging lens 4 are inserted into the mounting hole 55. Next, the plate spring 8 is fitted over the lower surface side of the module body 5, biasing the reimaging lens 4 and the aperture mask 6 against the receiving surface 55a. Thereafter, the reflecting mirror 2 is inserted between the mirror compression portion 82 of the plate spring 8 and the angular portion 53 of the module body 5. Thus, the reflecting mirror 2 is biased toward the receiving surface 53a by the mirror compression portion 82 and is accurately and closely held to the receiving surface 53a. Because no adhesive is interposed between the receiving surface 53 and the reflecting mirror 2, mounting angle errors are minimal. Moreover, because the application of adhesive, drying, and the like troublesome processes are entirely dispensed with, the workability is increased. In addition, the plate spring 8 can be assembled by simply inserting the plate spring 8 from the lower surface side of the module body 5. Because the plate spring 8 is prevented from falling off by the mounting holes 81a and the protuberances 54a, the operation is simple, and there is no danger of the reflecting mirror 2 becoming detached after assembly. Because the aperture 52a is completely covered by the reflecting mirror 2 and the plate spring 8, there is no need to cover the aperture 52a with screening tape. Thus, the number of parts and the number of working steps are reduced. Because the reimaging lens 4 and the reflecting mirror 2 are biased by a single plate spring 8, the number of components is reduced.

After mounting the reflecting mirror 2, play in the reimaging lens 4 is preferably eliminated by pouring filling material in the concave portion 56 which forms an aperture in the upper surface of the module body 5. Then, the infrared cutoff filter 10, condenser lens 3, mask member 7, and cover glass 12 are installed in sequence into the entry portion 50 of the module body 5. Thereafter, the entry portion 50 is covered and fixed with the compression member 14. Furthermore, the module body 5 and the image sensor 9, are glued. Finally, screening material (not shown) is affixed to screen light from the aperture portions between the image sensor 9 and the module body 5, etc., completing the assembly.

Figure 12:
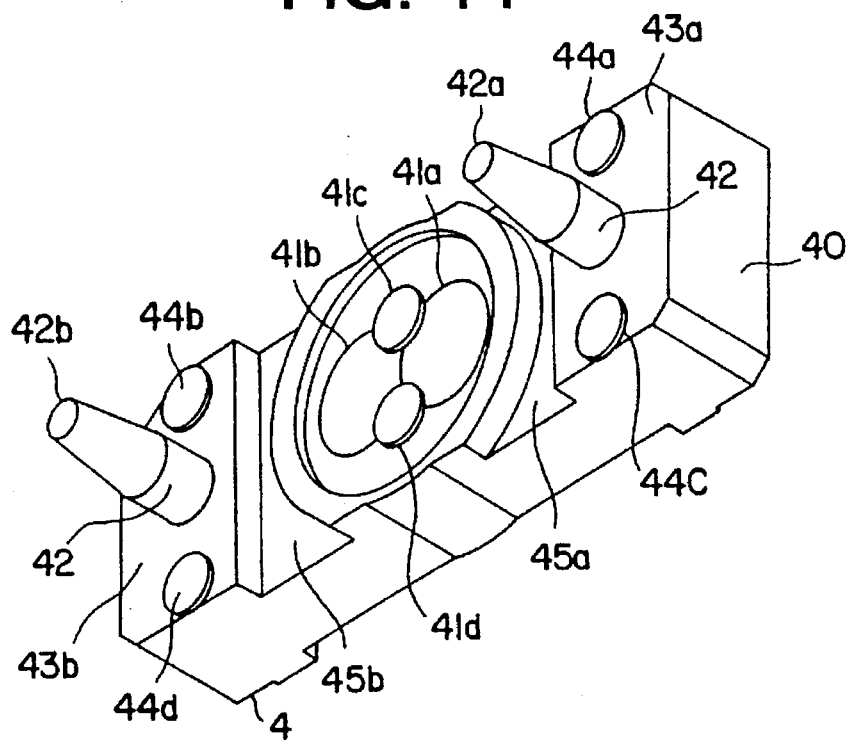
FIG. 12 is an oblique view of a reimaging lens assembled in the focus detection device in accordance with the third preferred embodiment of the present invention.

FIG. 12 is an oblique view of a reimaging lens assembled in the focus detection device in accordance with a third preferred embodiment of the present invention. A pair of bosses 42, having tapered portions 42a, 42b, respectively, are formed on the reimaging lens 4. Moreover, foot members 44a–44d which protrude a minute amount (for example, about 0.5 mm) are disposed on the boss forming surfaces 43a, 43b. The boss forming surfaces 43a, 43b and the lens pieces 41a–41d are discontinuously divided into sections by grooves 45a, 45b extending across the baseplate 40.

A detailed explanation regarding the eliminating play in the reimaging lens is hereinafter given with reference to FIGS. 13–18. In the following description, the Z direction is the upward direction and the opposite of the Z direction is taken as the downward direction. Play of the reimaging lens 4 in the direction along the receiving surface 55a is not completely eliminated solely by biasing the reimaging lens 4, with the plate spring 8, toward the receiving surface 55a. When the position of the reimaging lens 4 is displaced, the positional relationship of the image sensor 9 and the reimaging lens 4 is displaced and focus detection errors arise. For example, when the reimaging lens undergoes a rotary motion in a plane parallel to the receiving surface 55a, focus detection accuracy falls with respect to an obliquely inclined edge form of subject in the photographic picture plane.

Figure 14:
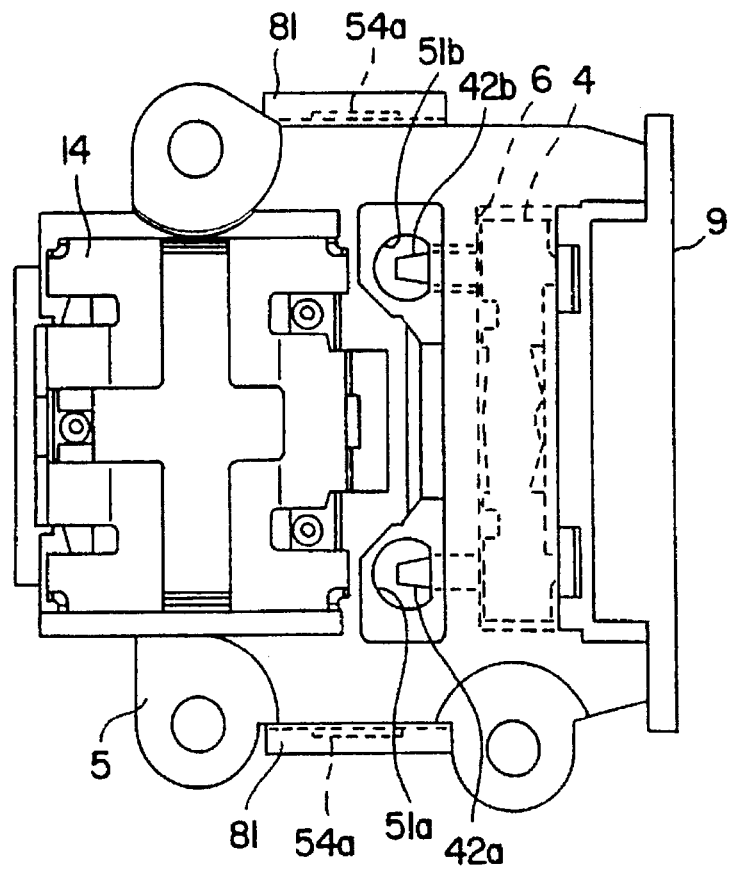
FIG. 14 is a top view of the focus detection device in accordance with the third preferred embodiment of the present invention.
Figure 13:
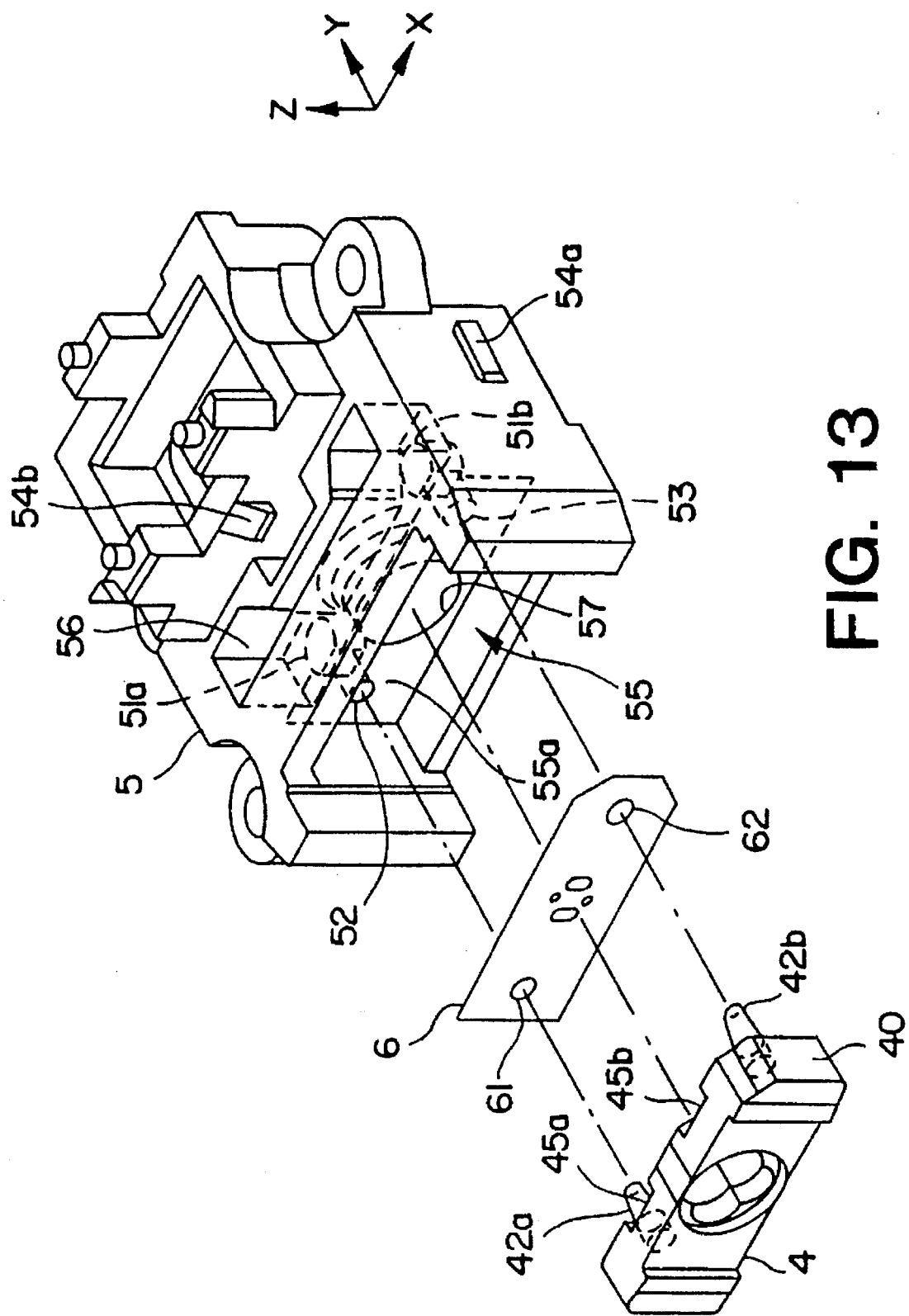
FIG. 13 is an exploded oblique view of the focus detection device in accordance with the third preferred embodiment of the present invention.

FIG. 13 is an exploded oblique view of the focus detection device in accordance with a preferred embodiment of the present invention. FIG. 14 is a top view of the focus detection device in accordance with a third preferred embodiment of the present invention. When the reimaging lens 4 is inserted into the mounting hole 55 of the module body 5, the boss portions 42 are inserted into the receiving holes 52 and 53 of the module body 5 through the through holes 61 and 62 of the aperture mask 6. The respective taper portions 42a and 42b of the boss portions 42 project into D-shaped holes 51a and 51b of the module body 5. The aperture mask 6 comes into contact with the foot members 44a–44d (see FIG. 12), and a minute clearance arises between the aperture mask 6 and the boss forming surfaces 43a and 43b (see FIG. 12). The D-shaped holes 51a and 51b form apertures in the bottom surface of the concave portion 56. The cross sectional form of the receiving hole 52 is circular and slightly larger than the boss 42. The cross sectional form of the receiving hole 53 is a slotted hole, slightly larger in the left and right direction (the X direction) than the boss 42. The through hole 61 of the aperture mask 6 is circular, and the through hole 62 is a slotted hole. Moreover, a passage hole 57 is provided through which the focus detection light beam, reflected by the reflecting mirror 2, passes towards the reimaging lens 4.

Figure 15:
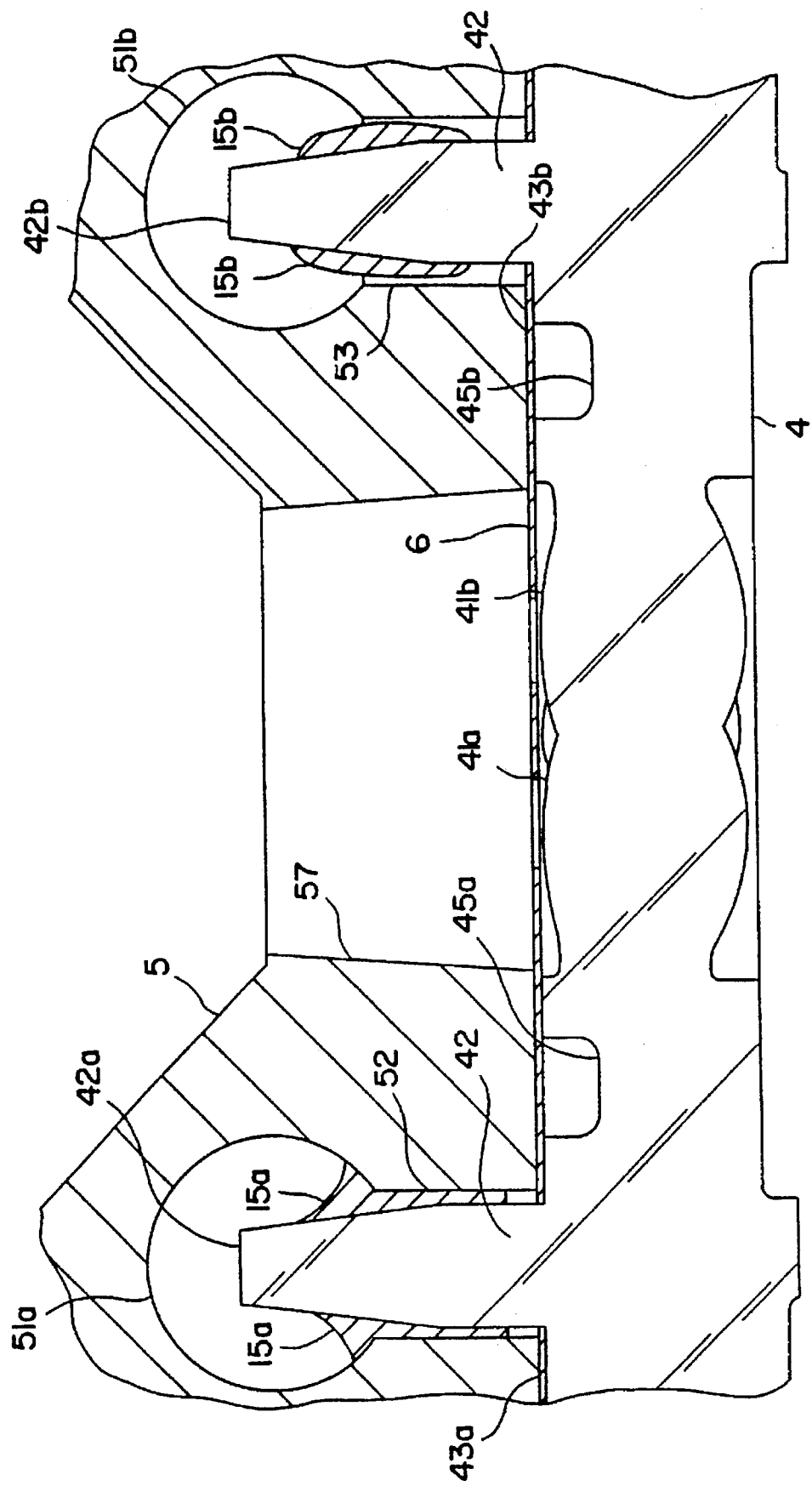
FIG. 15 is a cross section of the focus detection device set forth in FIG. 10, taken along the line VIII—VIII of FIG. 10.
Figure 16:
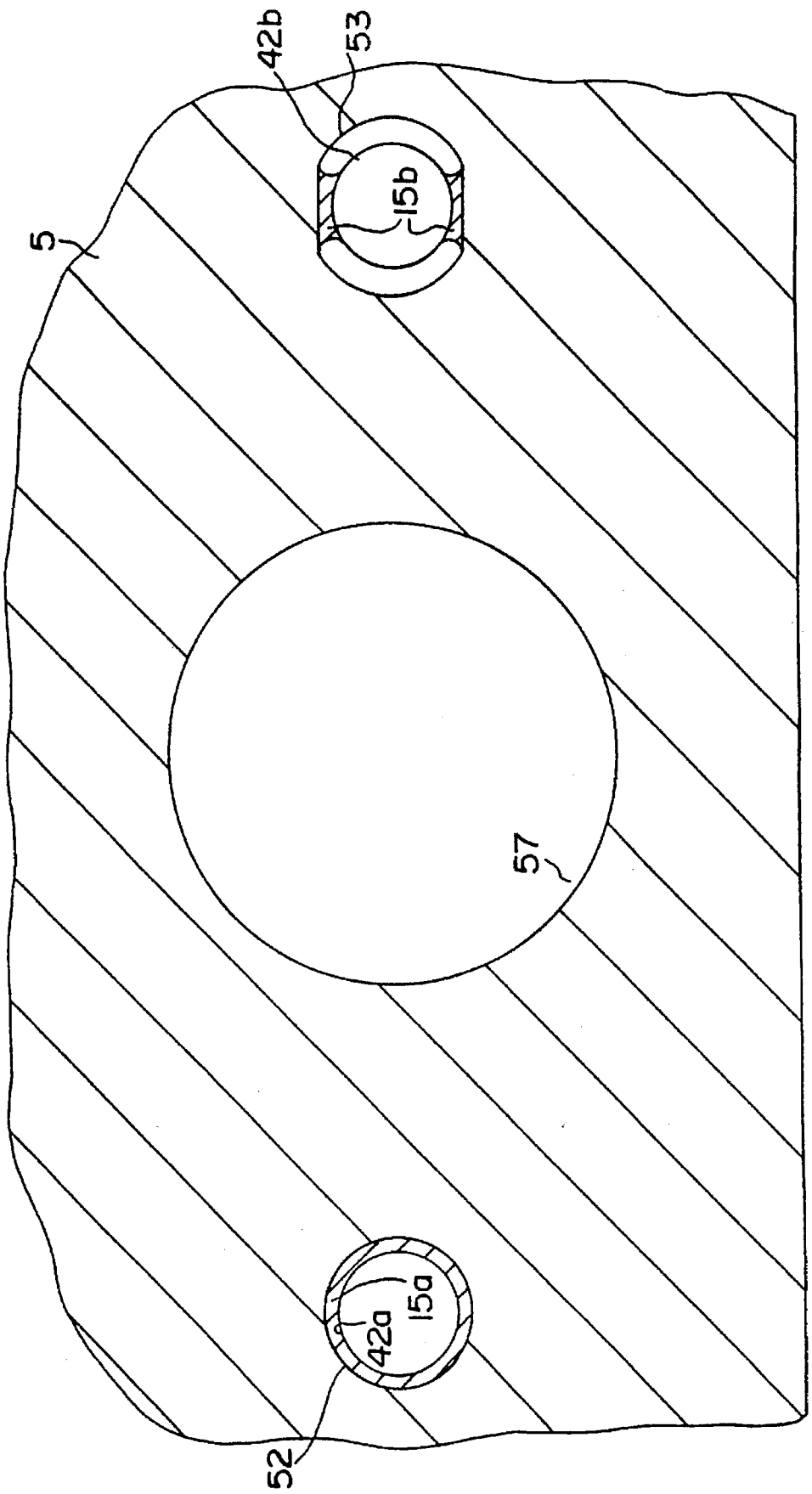
FIG. 16 is a cross section of the focus detection device set forth in FIG. 10, taken along the line IX—IX of FIG. 10.

FIG. 15 is a cross section of the focus detection device set forth in FIG. 10, taken along the line VIII—VIII of FIG. 10. FIG. 16 is a cross section of the focus detection device set forth in FIG. 10, taken along the line IX—IX of FIG. 10. Filling material is flowed into the D-shaped holes 51a and 51b, by inserting the nozzle of a dispenser (not shown) packed with filling material into the concave portion 56. The filling material permeates, by capillary action, into the clearances between the taper portions 42a and 42b and the receiving holes 52 and 53. When the filling material has set, the space between the taper portions 42a, 42b and the receiving holes 52, 53 is filled with hardened layers 15a, 15b. The hardened layers 15a and 15b eliminate the play of the reimaging lens along the receiving surface 55a. By suitable adjustment of the quantity of filling material, the whole circumference of the taper portion 42a can be buried by the hardened layer 15a, while at least the top and bottom end sides closest to the receiving hole 53 are buried by the hardened layer 15b. Moreover, a setting agent for the filling material may be flowed in through the D-shaped holes 51a and 51b, to shorten the setting time.

Because the nozzle of a dispenser is inserted into the concave portion 56 and filling material is flowed into the D-shaped holes 51a and 51b, the filling material which goes along the surfaces of the module body 5 and flows to the reimaging lens 4 side does not contaminate the lens pieces 41a–41d. Moreover, if an excessive amount of filling material is supplied, filling material penetrates from the receiving holes 52 and 53 to the boss forming surfaces 43a and 43b side of the reimaging lens 4. Because a clearance is established by the foot members 44a–44d, between the reimaging lens 4 and the aperture mask 6, and also because the boss forming surfaces 43a and 43b and the lens pieces 41a–41d are divided by the groove portions 45a and 45b, excess filling material accumulates in the clearance between the boss forming surfaces 43a and 43b and the aperture mask 6 (not shown), and does not adhere to the lens pieces 41a–41d.

Moreover, an instant adhesive like cyanoacrylate, can be used in the filling agent. Cyanoacrylate has no adhesiveness with respect to the reimaging lens 4 made of resin, as mentioned above. However, the reimaging lens 4 is biased in the axial direction (the Y direction of FIG. 13) by the lens compression portion 83 (see FIG. 11) of the plate spring 8. Further, the hardened layers 15a and 15b eliminate the play only in the X-Z directions, even though there is no adhesiveness.

Figure 17:
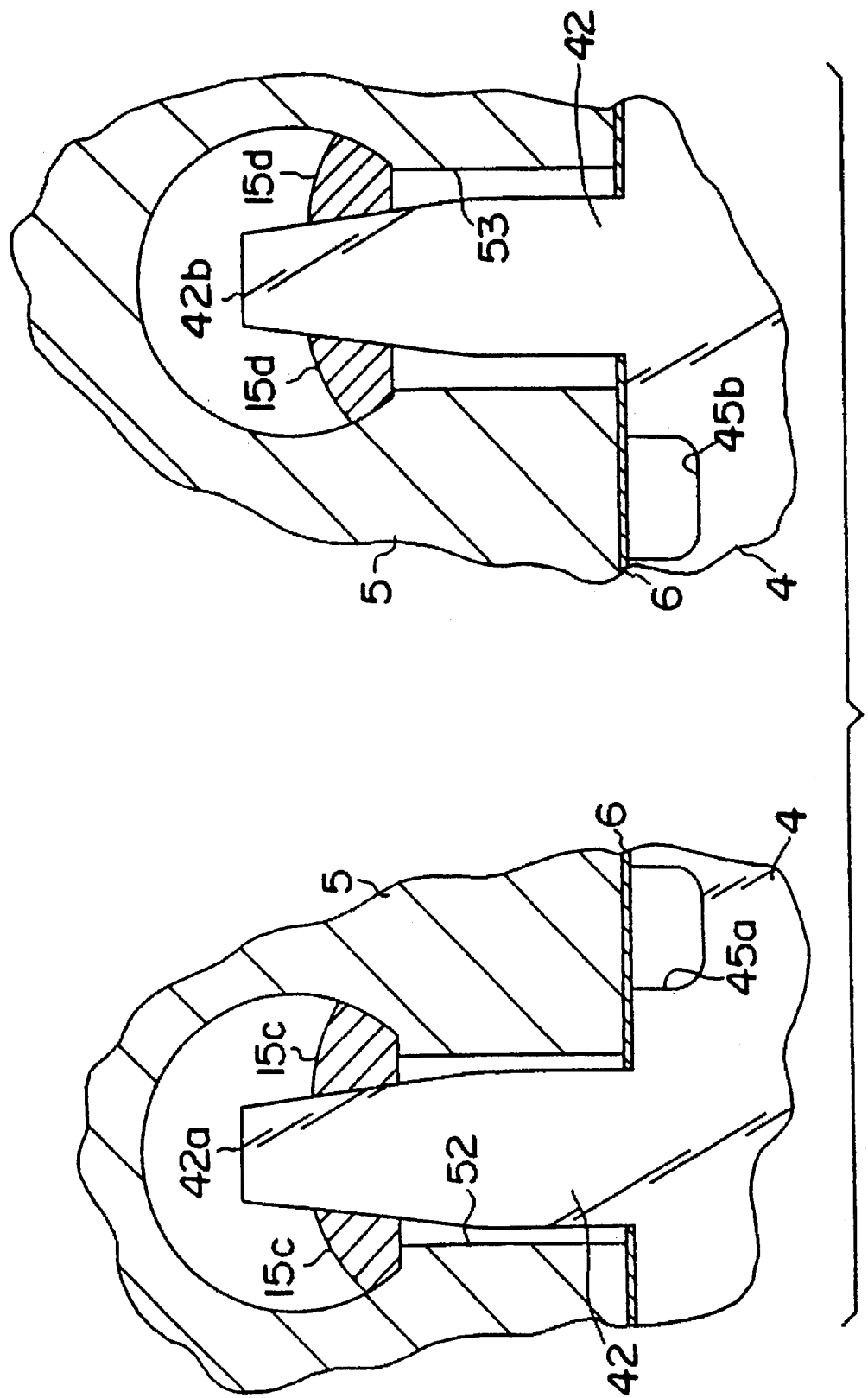
FIG. 17 is a cross section of a focus detection device set forth in FIG. 10, taken along the line VIII—VIII of FIG. 10 showing an alternative structure.

FIG. 17 is a cross section of a focus detection device set forth in FIG. 10, taken along the line VIII—VIII of FIG. 10 showing an alternative structure. If, based on the viscosity and the wetting ability of the filling agent, the filling agent cannot penetrate by capillary action into the clearances of the taper portions 42a and 42b and the receiving holes 52 and 53, hardened layers 15c and 15d may be formed to enclose portions of the taper portions 42a, 42b protruding into the D-shaped holes 51a, 51b. Moreover, even in the case that the amount of the filling agent supplied is insufficient, and the filling agent does not penetrate into the clearance between the taper portions 42a and 42b and the receiving holes 52 and 53, play is eliminated by the formation of the hardened layers 15c and 15d.

Figure 18:
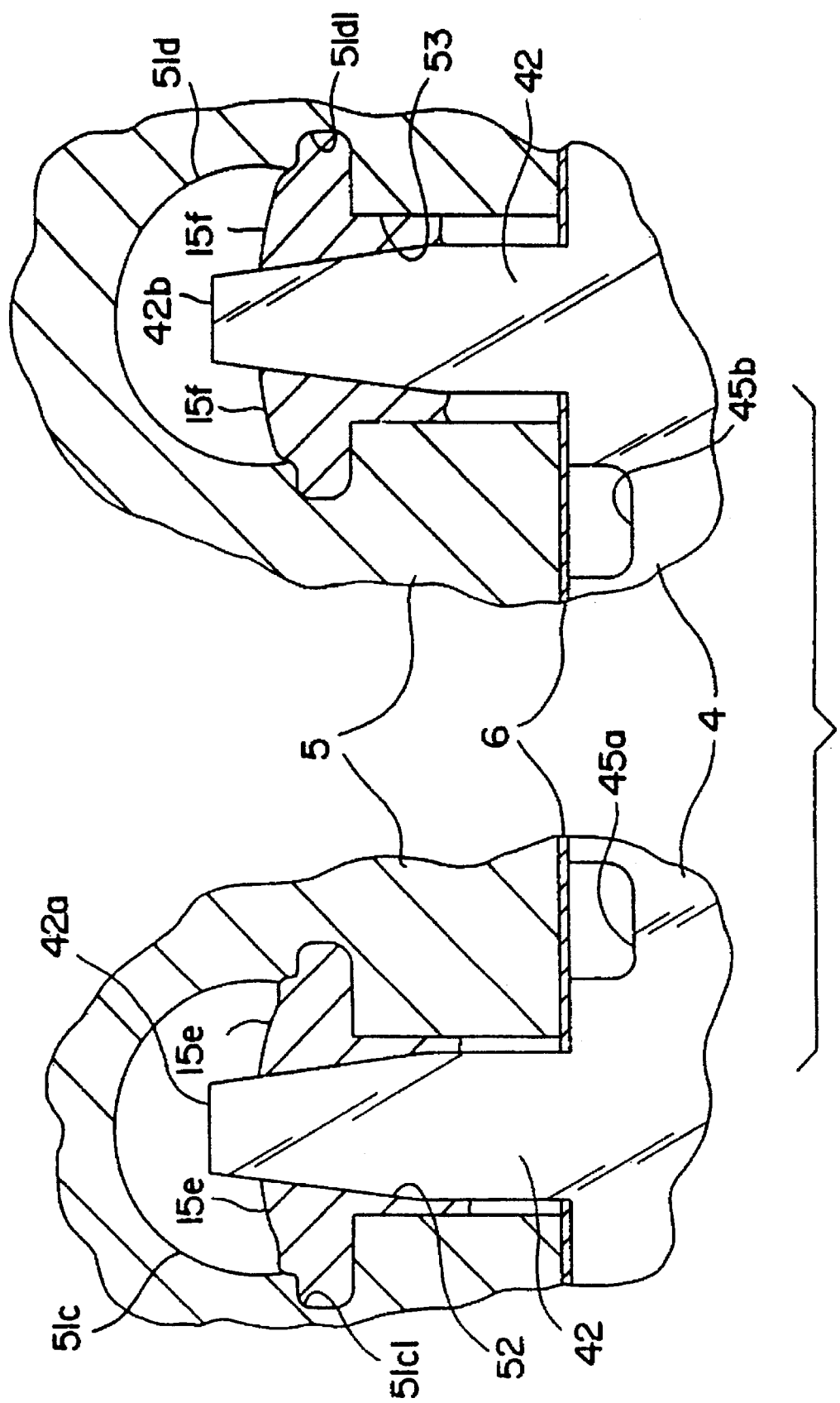
FIG. 18 is a cross section of the focus detection device set forth in FIG. 10, taken along the line VIII—VIII of FIG. 10 showing an alternative structure.

FIG. 18 is a cross section of the focus detection device set forth in FIG. 10, taken along the line VIII—VIII of FIG. 10 showing an alternative structure. It is not necessary for the hardened layers 15a–15d (see FIGS. 16 and 17) to have adhesiveness for the reimaging lens 4, but in order to fix the hardened layers 15a–15d themselves in the module body 5, it is generally necessary for the filling agent to have adhesiveness for the module body 5. However, as shown in FIG. 18, grooves 51c1, 51d1 may be formed in locations of the D-shaped holes 51c, 51d which face the taper portions 42a, 42b. By the interfitting the hardened layers 15e and 15f, formed by the filling agent, and the grooves 51c1 and 51d1, the hardened layers 15e, 15f are fixed with respect to the module body 5. Accordingly, it is not necessary for the filling agent to have adhesiveness with respect to either of the module body 5 and the reimaging lens 4.

In accordance with the preferred embodiment of the present invention, a decrease in focus detection accuracy, due to play in the reimaging lens, can be prevented. Without the hardened layers, when the module body 5 is subjected to a large acceleration due to vibration or impact, the reimaging lens tilts in the receiving surface 55a, and a the focus detection accuracy, with respect to an oblique edge shape of subject, decreases.

Moreover, if the biasing force of the lens compression portion 83 of the plate spring 8 is increased, the reimaging lens 4 is held more tightly. However, the plate spring 8 cannot be made so large as it is impossible to fit inside a camera. Moreover, if the spring force of the plate spring 8 is increased, detaching the plate spring 8 from the module body 5 also becomes difficult. When the reimaging lens 4 is retained by the plate spring 8 alone, there is a risk that if the operator were to apply force to the reimaging lens, for example by striking it, during the assembly of the focus detection module 24, the position of the reimaging lens 4 is displaced.

It is possible to prevent play of the reimaging lens 4 by properly fitting the bosses 42 and the receiving holes 52 and 53, but the required dimensional accuracy becomes rigorous and manufacturing cost increases. If the bosses 42 are formed with a larger diameter than the receiving holes 52 and 52, and if the bosses 42 are pressed into the receiving holes 52 and 52, the play of the reimaging lens 4 can be prevented, however the bosses 42 gradually deform during the process of pressing in, their base end portions bulge into a collar shape, and the reimaging lens 4 cannot be held closely against the receiving surface 55a via the aperture plate 6. In this case, the operator, due to the increase in the resistance of the reimaging lens 4 to pushing in, mistakenly thinks that the reimaging lens has been pushed into the predetermined position, and there is a risk that the module will be sent to the next assembly process with the reimaging lens in a location different from the design location.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A lens securing structure of a focal point detection device comprising:

a lens unit, including at least one lens said lens unit having at least three contact areas on a first surface;

a support member to support said lens unit, said support member having at least three contact areas on a second surface; and a force exerting unit to exert a force pressing the contact areas on the first surface of said lens unit against the contact areas on the second surface of said support member;

wherein the contact areas on the second surface of said support member provide an alignment structure to prevent movement in a plane substantially perpendicular to the force exerted by said force exerting unit at a first pair of the contact areas on the first and second surfaces, while permitting movement only parallel to a line within the plane at a second pair of the contact areas on the first and second surfaces and permitting movement within the plane at a third pair of the contact areas of the first and second surfaces.

2. A lens securing structure of a focal point detection device as in claim 1, wherein the focal point detection device detects a focal point adjustment status of a photographic lens having an optical axis, using a distribution of multiple light quantities relating to a subject targeted for detection by the focal point detection device, and wherein said lens unit is a lens aggregate, having multiple lenses on a substrate, the at least three contact areas on the substrate, said lens aggregate oriented substantially perpendicular to the optical axis of the photographic lens so that light passes through the multiple lenses in spatially differing regions, the multiple lenses being formed into a single body on the substrate.

3. A lens securing structure of a focal point detection device as in claim 1, wherein said lens unit is a lens aggregate formed of a non-crystalline polyolefin group resin, having multiple lenses on a substrate, the first through third protuberances protruding from the substrate.

4. A lens securing structure of a focal point detection device as in claim 3, wherein said support member is formed of resin with added glass fiber chips.

5. A lens securing structure of a focal point detection device as in claim 1, wherein said lens unit further includes first through third protuberances on the first surface of said lens unit, with the at least three contact areas of the first surface on the first through third protuberances, and wherein the at least three contact areas on the second surface of said support member include first through third contact areas corresponding to the first through third protuberances, the first contact area receiving the first protuberance and restraining movement of the first protuberance in all directions, the second contact area receiving the second protuberance and restraining movement of the second protuberance except parallel to the line within the plane, and the third contact area receiving the third protuberance and not restraining movement of the third protuberance on the plane.

6. A lens securing structure of a focal point detection device as in claim 5 wherein the first through third protuberances each have ends hemispherically shaped;

wherein the first contact area is a conical cavity;

wherein the second contact are is a V-shaped groove; and wherein the third contact area has a planar surface.

7. A lens securing structure of a focal point detection device as in claim 5, wherein said force exerting unit includes at least one spring to generate the force exerted.

8. A lens securing structure of a focal point detection device as in claim 7, wherein said force exerting unit has at least one end secured to said support member and another end forming a plate spring with at least two, tongue-shaped portions.

9. A lens securing structure of a focal point detection device as in claim 8, wherein a first one of the tongue-shaped portions exerts pressure along a first line substantially passing through the first protuberance and the first contact part, and a second one of the tongue-shaped portions exerts pressure along a second line closer to the second and third protuberances than the first protuberance.

10. A lens securing structure of a focal point detection device as in claim 5, wherein said lens unit is a lens aggregate having multiple lenses on a substrate, the first through third protuberances protruding from the substrate.

11. A lens securing structure of a focal point detection device as in claim 10, wherein the focal point detection device detects a focal point adjustment status of a photographic lens having an optical axis, using a distribution of multiple light quantities relating to a subject targeted for detection by the focal point detection device, and wherein said lens aggregate is oriented substantially perpendicular to the optical axis of the photographic lens so that light passes through the multiple lenses in spatially differing regions, the multiple lenses being formed into a single body on the substrate.

12. A lens securing structure of a focal point detection device as in claim 10, wherein the first through third contact areas of said support member have a harder surface than the first through third protuberances on said lens aggregate.

13. A lens securing structure of a focal point detection device as in claim 12, wherein said lens aggregate is formed of a non-crystalline polyolefin group resin.

14. A lens securing structure of a focal point detection device as in claim 12, wherein said support member is formed of resin with added glass fiber chips.

15. A lens securing structure of a focal point detection device, comprising:

a support member having first through third protuberances formed on a first surface of one side of said support member;

a lens aggregate forming at least part of the focal point detection device and having multiple lenses formed into a unit on a substrate providing a first contact area to receive the first protuberance and prevent all movement in a contact plane, a second contact area to receive the second protuberance and permit movement only parallel to one line in the contact plane and a third contact area to receive the third protuberance and permit movement in all directions Within the contact plane; and a force exerting unit to exert a force pressing the first through third contact areas of said lens aggregate against the first through third protuberances of said support member, respectively.

16. A lens securing structure of a focal point detection device as recited in claim 15, wherein the first through third protuberances each have ends hemispherically shaped;

wherein the first contact area is a conical cavity;

wherein the second contact area is a V-shaped groove; and wherein the third contact area has a planar surface.

17. A lens securing structure of a focal point detection device as in claim 15, wherein the focal point detection device detects focal point adjustment status of a photographic lens having an optical axis, using a distribution of multiple light quantities relating to a subject targeted for detection by the focal point detection device, wherein said lens aggregate is oriented substantially perpendicular to the optical axis of the photographic lens so that light passes through the multiple lenses in spatially differing regions, the multiple lenses being formed into a single body on the substrate, and wherein said force exerting unit has at least one end secured to said support member and another end forming a plate spring with at least two tongue-shaped portions.

18. A lens securing structure of a focal point detection device as in claim 17, wherein said lens aggregate is formed of a non-crystalline polyolefin group resin and said support member is formed of a resin with embedded glass fiber chips.

19. A lens securing structure of a focal point detection device, comprising:

a substrate having at least one lens formed therein and having first and second protuberances formed on a first surface of said substrate;

a support member having a second surface facing the first surface of said substrate with first and second cavities therein, the first and second protuberances on said substrate disposed in the first and second cavities, respectively, with spaces therebetween;

a force exerting unit to exert a force pressing said substrate against said support member; and a filler injected as a curable fluid and cured in the spaces between the first and second cavities and the first and second protuberances, respectively.

20. A lens securing structure of a focal point detection device as in claim 19, wherein the focal point detection device detects focal point adjustment status of a photographic lens having an optical axis, using a distribution of multiple light quantities relating to a subject targeted for detection by the focal point detection device, and wherein the at least one lens in said substrate is a lens aggregate, formed of multiple lenses, oriented substantially perpendicular to the optical axis of the photographic lens so that light passes through the multiple lenses in spatially differing regions, the multiple lenses being formed into a single body on said substrate.

21. A lens securing structure of a focal point detection device as in claim 19, wherein said lens aggregate is formed of a non-crystalline polyolefin group resin.

22. A lens securing structure of a focal point detection device as in claim 19, wherein said force exerting unit has at least one end secured to said support member, and a second end forming a plate spring with a pair of tongue-shaped parts in contact with said substrate.

23. A lens securing structure of a focal point detection device as in claim 19, wherein said support member is formed of a resin with embedded glass fiber chips.

24. A lens securing structure of a focal point detection device as in claim 19, wherein the curable fluid is a cyanoacrylate group instant adhesive.

25. A lens securing structure of a focal point detection device as in claim 19, wherein the first and second cavities have first and second openings, respectively, on the second surface facing said substrate, the first opening having a circular cross-section and the second opening having an oblong cross-section.

26. A lens securing structure of a focal point detection device as in claim 19, wherein the first and second cavities in said support member each have recessed sections, and wherein said filler is disposed in the recessed sections preventing movement of said filler regardless of whether a significant amount of adhesiveness exists between said filler and either of said support member and said substrate.

27. A lens securing structure of a focal point detection device as in claim 19, wherein said support member further includes at least one opening on a third surface, separate from the second surface, the at least one opening connecting with interior walls of the first and second cavities in the second surface of said support member, and wherein said filler is injected as the curable fluid through the at least one opening onto the interior walls of the first and second cavities to make contact with the first and second protuberances.

28. A lens securing structure of a focal point detection device as in claim 27, wherein the first surface of said substrate further includes a first portion surrounding the at least one lens maintained closer to said support member, by the force exerted by said force exerting unit, than a second portion forming indentations between the first portion and the first and second protuberances.

29. A lens securing structure of a focal point detection device as in claim 27, wherein the first and second cavities have first and second openings, respectively, on the second surface facing said substrate, the first opening having a circular cross-section and the second opening having an oblong cross-section.

30. A lens securing structure of a focal point detection device as in claim 27, wherein the focal point detection device detects focal point adjustment status of a photographic lens having an optical axis, using a distribution of multiple light quantities relating to a subject targeted for detection by the focal point detection device, and wherein the at least one lens in said substrate is a lens aggregate, formed of multiple lenses, oriented substantially perpendicular to the optical axis of the photographic lens so that light passes through the multiple lenses in spatially differing regions, the multiple lenses being formed into a single body on said substrate.

31. A lens securing structure of a focal point detection device as in claim 30, wherein the first surface of said substrate further includes a first portion surrounding the lens aggregate maintained closer to said support member, by the force exerted by said force exerting unit, than a second portion forming indentations between the first portion and each of the first and second protuberances.

32. A method of assembling a focal point detection device, comprising the steps of:

(a) positioning first and second protuberances from a first surface of a lens substrate into first and second cavities in a second surface of a support member, respectively;

(b) installing a plate spring to exert a force pressing the lens substrate and support member together;

(c) injecting a curable liquid into each of the first and second cavities to make contact with the first and second protuberances; and (d) curing the curable liquid until the curable liquid hardens.

33. A method as in claim 32, wherein said positioning in step (a) includes positioning an aperture mask between the lens substrate and the support member, the aperture mask having holes to allow light and the first and second protuberances to pass through.

34. A method as in claim 32, further comprising the step of (e) installing a surface mirror between the support member and the plate spring between steps (b) and (c).

35. A method as in claim 32,
wherein each of the first and second cavities has a first opening on the second surface of the support member to receive the first and second protuberances, respectively, and connects to a second opening on a third surface of said support member different from the second surface, and
wherein said injecting in step (c) is performed without injecting fluid past the second surface of the support member via the first opening of either of the first and second cavities.

36. A method as in claim 35,
wherein the third surface is approximately perpendicular to the second surface, and
wherein said injecting in step (c) is performed through the second opening for each of the first and second cavities.

37. A focus detection device comprising:
a focus detection optical system;
a hollow module body for holding said focus detection optical system, the module body provided with an aperture;
a deflecting member positioned near the aperture in the hollow module body to deflect a focus detection light beam; and
a biasing member to bias said deflecting member over the aperture and against said hollow module body and to compress said hollow module body so as to secure said deflecting member.

38. A focus detection device, as set forth in claim 37, wherein said biasing member covers a portion of the aperture in said hollow module body.

39. A focus detection device, as set forth in claim 37, further comprising:
a reimaging lens positioned in the hollow module body so as to receive the focus detection light beam, said reimaging lens being biased by said biasing member against said hollow body module so as to secure said reimaging lens.

40. A focus detection device, as set forth in claim 37, wherein said biasing member is a plate spring.

41. A focus detection device, as set forth in claim 37, wherein said biasing member is provided with a pair of pressure contacts which compress said hollow body module, and said hollow body module is provided with a pair of protuberances which cooperate with said pressure contacts to restrain said pressure contacts.

42. A focus detection device comprising:
a focus detection optical system;
a module body for holding said focus detection optical system, the module body being provided with a hollow portion, the module body provided with an aperture at a bend in the hollow portion;
a deflecting member positioned near the aperture in the hollow module body to deflect a focus detection light beam through the bend; and
a plate spring to bias said deflecting member over the aperture and against said hollow module body and to compress said hollow module body so as to secure said deflecting member.

43. A focus detection device, as set forth in claim 42, wherein said plate spring covers a portion of the aperture in said hollow module body.

44. A focus detection device, as set forth in claim 42, further comprising:
a reimaging lens positioned in the hollow module body so as to receive the focus detection light beam, said reimaging lens being biased by said plate spring against said hollow body module so as to secure said reimaging lens.

45. A focus detection device, as set forth in claim 44, wherein said plate spring is provided with a pair of pressure contacts which compress said hollow body module, and said hollow body module is provided with a pair of protuberances which cooperate with said pressure contacts to restrain said pressure contacts.

* * * * *

UNITED STATES PATENT AND TRADEMARK OFFICE
CERTIFICATE OF CORRECTION

PATENT NO. : 5,659,815
DATED : August 19, 1997
INVENTOR(S) : Kimio UEMATSU, et al.

It is certified that error appears in the above-indentified patent and that said Letters Patent is hereby corrected as shown below:

Col. 18, line 4, change "are" to --area--.

Col. 18, line 60, change "Within" to --within--.

Signed and Sealed this

Thirtieth Day of December, 1997

Attest:

BRUCE LEHMAN

Attesting Officer     Commissioner of Patents and Trademarks